(12) United States Patent
Cutler

(10) Patent No.: US 7,664,695 B2
(45) Date of Patent: Feb. 16, 2010

(54) SECURITIES MARKET AND MARKET MAKER ACTIVITY TRACKING SYSTEM AND METHOD

(76) Inventor: Stephen Cutler, P.O. Box 333, Captiva, FL (US) 33924

( * ) Notice: Subject to any disclaimer, the term of this patent is extended or adjusted under 35 U.S.C. 154(b) by 1496 days.

(21) Appl. No.: 09/911,772

(22) Filed: Jul. 24, 2001

(65) Prior Publication Data

US 2003/0065608 A1    Apr. 3, 2003

(51) Int. Cl.
    *G06Q 40/00*    (2006.01)
(52) U.S. Cl. .............................. 705/37; 705/38; 705/36; 705/35
(58) Field of Classification Search ............. 705/35–38, 705/34
    See application file for complete search history.

(56) References Cited

U.S. PATENT DOCUMENTS

| | | | |
|---|---|---|---|
| 5,101,353 A | 3/1992 | Lupien et al. | |
| 5,132,899 A | 7/1992 | Fox | |
| 5,214,579 A | 5/1993 | Wolfberg et al. | |
| 5,270,922 A * | 12/1993 | Higgins | 705/37 |
| 5,297,031 A | 3/1994 | Gutterman et al. | |
| 5,297,032 A | 3/1994 | Trojan et al. | |
| 5,339,392 A | 8/1994 | Risberg et al. | |
| 5,689,651 A | 11/1997 | Lozman | |
| 5,761,442 A | 6/1998 | Barr et al. | |
| 5,812,988 A * | 9/1998 | Sandretto | 705/36 R |
| 5,819,238 A | 10/1998 | Fernholz | |
| 5,857,176 A | 1/1999 | Ginsberg | |
| 5,946,666 A | 8/1999 | Nevo et al. | |
| 5,963,923 A | 10/1999 | Garber | |
| 6,006,206 A | 12/1999 | Smith et al. | |
| 6,012,046 A | 1/2000 | Lupien et al. | |
| 6,014,643 A | 1/2000 | Minton | |
| 6,016,483 A | 1/2000 | Rickard et al. | |
| 6,018,722 A | 1/2000 | Ray et al. | |
| 6,029,146 A | 2/2000 | Hawkins et al. | |
| 6,035,286 A | 3/2000 | Fried | |
| 6,041,313 A | 3/2000 | Gilbert et al. | |
| 6,049,782 A | 4/2000 | Gottesman et al. | |
| 6,061,663 A | 5/2000 | Bloom et al. | |

(Continued)

FOREIGN PATENT DOCUMENTS

JP    07296057    11/1995

(Continued)

OTHER PUBLICATIONS

The American derivatives revolution Philip McBride Johnson. International Financial Law Review. London: Mar. 2001. vol. 20, Iss. 3; p. 43.*

(Continued)

*Primary Examiner*—Frantzy Poinvil
*Assistant Examiner*—Clement Graham
(74) *Attorney, Agent, or Firm*—Renner, Otto, Boisselle & Sklar, LLP

(57) ABSTRACT

A method, system and computer program to monitor securities market activity to seek out imbalances in market activity that could lead to a price change in a particular security. Level 2 data is analyzed to track the activity of market makers and to derive an indicator of momentary upward or downward price pressure. The indicator associated with each selected security is displayed to a user.

207 Claims, 10 Drawing Sheets

U.S. PATENT DOCUMENTS

| | | | |
|---|---|---|---|
| 6,064,985 | A | 5/2000 | Anderson |
| 6,128,602 | A | 10/2000 | Northington et al. |
| 6,134,535 | A | 10/2000 | Belzberg |
| 6,195,647 | B1 | 2/2001 | Martyn et al. |
| 6,272,474 | B1 | 8/2001 | Garcia |
| 6,278,982 | B1 * | 8/2001 | Korhammer et al. ...... 705/36 R |
| 6,289,321 | B1 | 9/2001 | Suganuma |
| 6,317,728 | B1 | 11/2001 | Kane |
| 6,338,047 | B1 | 1/2002 | Wallman |
| 6,615,188 | B1 | 9/2003 | Breen et al. |
| 6,907,404 | B1 | 6/2005 | Li |
| 6,963,855 | B1 | 11/2005 | Borzenko |
| 7,082,410 | B1 * | 7/2006 | Anaya et al. ................. 705/37 |
| 2001/0034686 | A1 * | 10/2001 | Eder ............................ 705/36 |
| 2003/0055768 | A1 | 3/2003 | Anaya et al. |
| 2003/0078865 | A1 | 4/2003 | Lee |
| 2003/0083973 | A1 * | 5/2003 | Horsfall ....................... 705/37 |
| 2003/0101125 | A1 | 5/2003 | McGill et al. |

FOREIGN PATENT DOCUMENTS

| | | |
|---|---|---|
| JP | 11224295 | 8/1999 |
| WO | 9722072 | 6/1997 |

OTHER PUBLICATIONS

Labier, M. R., *The Nasdaq Trader's Toolkit*, John Wiley & Sons, Inc., Chapter 4, pp. 28-43, 2001.

Chester, Thomas and Alden, Richard H., "Mastering Excel 97", 4th ed., 1997. SYBEX Inc. (pp. 254-255 and 766).

Jurik, Mark—Editor, "Computerized Trading: Maximizing Day Trading and Overnight Progits", New York Istitute of Finance, Prentice Hall, (1999), pp. 47 and 72.

\* cited by examiner

| Symbol | Relative Volume | | Pressure | | Market Makers | | Actual Volume (hundreds) | | Pressurized Volume (hundreds) | |
|---|---|---|---|---|---|---|---|---|---|---|
| | Bid | Ask | Buy | Sell | Bid | Ask | Bid | Ask | Bid | Ask |
| AAPL | 36.8% | 63.2% | -24 | -20 | 38 | 42 | 93 | 160 | -60 | -141 |
| ADBE | 49.2% | 50.8% | 0 | 0 | 8 | 8 | 29 | 30 | 0 | 1 |
| AMGN | 56.7% | 43.3% | 8 | 7 | 15 | 14 | 38 | 29 | 20 | 21 |
| AMZN | 35.4% | 64.6% | -3 | 5 | 8 | 10 | 28 | 51 | -15 | 10 |
| ATHM | 57.8% | 42.2% | -2 | -3 | 9 | 6 | 93 | 68 | -12 | -15 |
| BGEN | 47.4% | 52.6% | 2 | -4 | 12 | 16 | 55 | 61 | 10 | 2 |
| BRCM | 53.8% | 46.2% | 6 | -3 | 12 | 14 | 56 | 48 | 30 | -12 |
| COMS | 50.6% | 49.4% | 5 | 5 | 14 | 10 | 170 | 166 | 60 | 58 |
| CSCO | 88.4% | 11.6% | 12 | 4 | 20 | 15 | 465 | 61 | 419 | 12 |
| DELL | 32.1% | 67.9% | -10 | -14 | 17 | 22 | 142 | 300 | -110 | -204 |
| GEMS | 39.0% | 61.0% | 2 | 1 | 6 | 4 | 41 | 64 | 3 | 1 |
| INTC | 38.1% | 61.9% | -6 | -9 | 12 | 18 | 93 | 151 | -40 | -98 |
| INTU | 41.2% | 58.8% | 2 | -1 | 4 | 7 | 14 | 20 | 1 | -2 |
| JNPR | 25.6% | 74.4% | -8 | -6 | 9 | 9 | 30 | 87 | -28 | -61 |
| MSFT | 46.8% | 53.2% | -4 | -9 | 8 | 11 | 88 | 100 | -30 | -75 |
| NXTL | 47.0% | 53.0% | 4 | -1 | 11 | 12 | 54 | 61 | -21 | 6 |
| ORCL | 35.5% | 64.5% | -8 | -12 | 16 | 17 | 66 | 120 | -43 | -88 |
| PALM | 82.5% | 17.5% | 0 | -3 | 7 | 6 | 132 | 28 | 0 | -10 |
| QLGC | 37.2% | 62.8% | -3 | 3 | 4 | 9 | 16 | 27 | -2 | 8 |
| SUNW | 72.9% | 27.1% | 14 | 11 | 18 | 14 | 213 | 79 | 210 | 72 |
| WCOM | 17.0% | 83.0% | -6 | -7 | 11 | 16 | 49 | 239 | -29 | -140 |
| YHOO | 38.9% | 61.1% | -3 | -7 | 11 | 14 | 49 | 77 | -6 | -17 |

56a (Watch List Mode)

FIG. 4A

| Symbol | Relative Volume | | Price | | Actual Volume | |
|--------|------|------|-------|-------|------|------|
|        | Bid  | Ask  | Bid   | Ask   | Bid  | Ask  |
| SEMA   | 100.0% | 0.0% | 15.76 | 0 | 100 | 0 |
| CEFT   | 19.8% | 80.2% | 44.93 | 45.2 | 18 | 73 |
| FLEX   | 93.6% | 6.4% | 28.01 | 28.1 | 73 | 5 |
| SBUX   | 16.7% | 83.3% | 18.88 | 18.99 | 10 | 50 |
| SHPGY  | 27.3% | 72.7% | 47.81 | 47.98 | 15 | 40 |
| ADCT   | 78.7% | 21.3% | 7.89 | 7.91 | 37 | 10 |
| INKT   | 25.0% | 75.0% | 8.93 | 9.03 | 10 | 30 |
| ORCL   | 92.3% | 7.7% | 16.98 | 17 | 36 | 3 |
| MCLD   | 100.0% | 0.0% | 6.03 | 0 | 38 | 0 |
| TMPW   | 70.6% | 29.4% | 50.15 | 50.7 | 24 | 10 |
| MFNX   | 100.0% | 0.0% | 6.1 | 0 | 33 | 0 |
| SUNW   | 65.6% | 34.4% | 19.72 | 19.85 | 21 | 11 |
| IMNX   | 29.0% | 71.0% | 15.54 | 15.65 | 9 | 22 |
| ERICY  | 3.2% | 96.8% | 6.45 | 6.51 | 1 | 30 |
| INTU   | 46.7% | 53.3% | 34.28 | 34.57 | 14 | 16 |
| VRTS   | 23.3% | 76.7% | 71.3 | 71.51 | 7 | 23 |
| CMGI   | 0.0% | 100.0% | 0 | 6.24 | 0 | 28 |
| TLAB   | 7.7% | 92.3% | 37.73 | 37.83 | 2 | 24 |
| TEVA   | 0.0% | 100.0% | 0 | 55.94 | 0 | 24 |
| PSFT   | 4.2% | 95.8% | 38.35 | 38.52 | 1 | 23 |
| BBBY   | 73.9% | 26.1% | 26.52 | 26.83 | 17 | 6 |
| BRCM   | 45.5% | 54.5% | 42.5 | 42.74 | 10 | 12 |
| BEAS   | 90.9% | 9.1% | 35.25 | 35.51 | 20 | 2 |
| MSFT   | 76.2% | 23.8% | 70.82 | 70.89 | 16 | 5 |
| SEBL   | 47.6% | 52.4% | 47.87 | 48.23 | 10 | 11 |
| SOTR   | 30.0% | 70.0% | 46.3 | 46.31 | 6 | 14 |
| XOXO   | 100.0% | 0.0% | 4.04 | 0 | 20 | 0 |
| CIEN   | 25.0% | 75.0% | 53.92 | 54.19 | 5 | 15 |

56b (Market Maker's Book Mode)

FIG. 4B

| Symbol | Relative Volume | | MMID | Actual Volume | |
|--------|------|------|------|------|------|
|        | Bid  | Ask  |      | Bid  | Ask  |
| KQIP | 52.6% | 47.4% | INCA | 407 | 367 |
| PMTC | 92.0% | 8.0% | REDI | 438 | 38 |
| CNET | 7.9% | 92.1% | INCA | 30 | 349 |
| SSCC | 99.7% | 0.3% | ARCA | 353 | 1 |
| SSCC | 3.1% | 96.9% | REDI | 10 | 317 |
| AMZN | 98.0% | 2.0% | ARCA | 294 | 6 |
| TEVA | 79.7% | 20.3% | ARCA | 200 | 51 |
| DBRSY | 52.5% | 47.5% | INCA | 125 | 113 |
| XOXO | 93.0% | 7.0% | MASH | 213 | 16 |
| ASML | 84.7% | 15.3% | ARCA | 194 | 35 |
| BBBY | 95.7% | 4.3% | INCA | 200 | 9 |
| XOXO | 99.5% | 0.5% | NITE | 200 | 1 |
| MCHP | 99.4% | 0.6% | INCA | 174 | 1 |
| ZION | 55.7% | 44.3% | INCA | 93 | 74 |
| ERICY | 74.2% | 25.8% | INCA | 115 | 40 |
| BPOP | 6.7% | 93.3% | ARCA | 10 | 140 |
| LAMR | 52.4% | 47.6% | INCA | 76 | 69 |
| ALTR | 43.3% | 56.7% | BTRD | 61 | 80 |
| CMGI | 84.4% | 15.6% | PERT | 108 | 20 |
| GEMS | 59.0% | 41.0% | MADF | 72 | 50 |
| YHOO | 99.2% | 0.8% | NITE | 120 | 1 |
| EXDS | 57.6% | 42.4% | ISLD | 68 | 50 |
| INTC | 5.1% | 94.9% | ARCA | 6 | 111 |
| WCOM | 13.4% | 86.6% | ISLD | 15 | 97 |
| CPWR | 99.1% | 0.9% | BARD | 110 | 1 |
| VOLVY | 90.9% | 9.1% | ISLD | 100 | 10 |
| ADLAC | 9.1% | 90.9% | INCA | 10 | 100 |
| CSCO | 79.4% | 20.6% | INCA | 85 | 22 |

56c (Market Stocks Mode)

FIG. 4C

FIG. 4D — 56d (Market Players Mode)

| MMID | Relative Volume Bid | Relative Volume Ask | Pressure Buy | Pressure Sell | Actual Volume Bid | Actual Volume Ask |
|---|---|---|---|---|---|---|
| INCA | 42.8% | 57.2% | 23 | -21 | 754 | 1006 |
| MLCO | 50.3% | 49.7% | -1 | -19 | 761 | 752 |
| ISLD | 49.3% | 50.7% | 24 | -15 | 698 | 717 |
| NITE | 47.3% | 52.7% | 31 | -38 | 547 | 609 |
| REDI | 56.6% | 43.4% | -25 | 16 | 602 | 462 |
| ARCA | 66.0% | 34.0% | -10 | 12 | 676 | 349 |
| MASH | 48.5% | 51.5% | -15 | 9 | 492 | 523 |
| BRUT | 55.8% | 44.2% | 31 | -46 | 559 | 442 |
| MWSE | 50.2% | 49.8% | 8 | -21 | 465 | 461 |
| MSCO | 52.5% | 47.5% | 2 | -9 | 473 | 428 |
| GSCO | 55.5% | 44.5% | 3 | 3 | 482 | 387 |
| BTRD | 40.9% | 59.1% | 1 | 5 | 297 | 343 |
| UBSW | 52.9% | 47.1% | 6 | -4 | 263 | 234 |
| PERT | 32.5% | 67.5% | 14 | -3 | 160 | 332 |
| MONT | 54.7% | 45.3% | -2 | -23 | 263 | 218 |
| SBSH | 39.7% | 60.3% | 22 | -32 | 190 | 288 |
| HRZG | 49.0% | 51.0% | -20 | -8 | 210 | 219 |
| PIPR | 36.8% | 63.2% | -5 | -4 | 140 | 240 |
| JPHQ | 55.5% | 44.5% | 0 | 0 | 207 | 166 |
| RSSF | 54.9% | 45.1% | 3 | 2 | 173 | 142 |
| FBCO | 40.4% | 59.6% | -12 | -21 | 122 | 180 |
| MADF | 26.1% | 73.9% | 12 | -16 | 76 | 215 |
| SLKC | 55.0% | 45.0% | -12 | 1 | 160 | 131 |
| NTRD | 45.9% | 54.1% | 1 | 1 | 133 | 157 |
| BEST | 56.7% | 43.3% | 2 | -2 | 148 | 113 |
| FCAP | 17.3% | 82.7% | 4 | -5 | 45 | 215 |
| PRUS | 52.6% | 47.4% | 1 | -11 | 120 | 108 |
| NDBC | 52.7% | 47.3% | -2 | 10 | 118 | 106 |

FIG. 4E — 56e (Insider Mode)

| Symbol | 3 Minute Bid | 3 Minute Ask | MMID | 15 Minute Bid | 15 Minute Ask |
|---|---|---|---|---|---|
| SEBL | 37.3% | 0.2% | NFSC | 11.9% | 0.2% |
| MCHP | 35.6% | 0.0% | SBSH | 10.2% | 0.3% |
| ORCL | 30.7% | 0.9% | MONT | 14.6% | 2.8% |
| WCOM | 30.6% | 1.7% | SLKC | 8.2% | 1.8% |
| MERQ | 29.9% | 0.0% | SLKC | 15.8% | 0.5% |
| VRSN | 29.7% | 0.0% | ABNA | 8.5% | 0.1% |
| FISV | 29.6% | 0.0% | JEFF | 18.0% | 0.0% |
| BMET | 29.1% | 0.0% | JPHQ | 15.1% | 0.7% |
| BBBY | 28.9% | 0.4% | UBSW | 8.6% | 4.0% |
| DISH | 28.8% | 4.1% | NFSC | 7.8% | 3.7% |
| CNET | 28.1% | 0.0% | NFSC | 6.7% | 0.0% |
| SANM | 27.9% | 2.0% | SNDV | 10.6% | 2.4% |
| SSCC | 27.7% | 1.0% | GSCO | 7.3% | 10.8% |
| ERICY | 26.6% | 0.1% | PERT | 13.4% | 2.3% |
| ABGX | 26.4% | 0.0% | PRUS | 8.3% | 0.4% |
| CHKP | 26.1% | 0.3% | MONT | 8.0% | 0.9% |
| ATHM | 26.0% | 0.0% | HAMR | 18.2% | 0.0% |
| BRCD | 25.7% | 0.2% | PIPR | 10.6% | 0.9% |
| ORCL | 25.3% | 0.3% | COWN | 19.7% | 2.0% |
| IDPH | 24.5% | 1.4% | SBSH | 9.8% | 3.2% |
| MEDI | 24.3% | 6.7% | GSCO | 9.8% | 5.5% |
| CEFT | 23.6% | 2.1% | DAIN | 15.2% | 7.0% |
| INTC | 23.5% | 0.4% | MSCO | 8.3% | 2.4% |
| ATML | 23.2% | 0.0% | UBSW | 22.7% | 0.9% |
| DISH | 23.0% | 0.0% | UBSW | 16.4% | 0.0% |
| ATML | 22.9% | 2.0% | NDBC | 10.0% | 5.2% |
| BVSN | 22.6% | 4.2% | SNDV | 10.9% | 1.2% |
| NXTL | 22.6% | 0.1% | RAMS | 16.4% | 8.8% |

| Symbol | Name | Field | Type | Value | Last | Time |
|---|---|---|---|---|---|---|
| JNPR | Daily Hi/Low | Price | Last | 36.5 | 33.94 | 10:45:05 |
| AAPL | Daily Hi/Low | Price | Last | 21.65 | 21.60 | 10:45:05 |
| DELL | Volume | Rel. Vol. | Bid | Below 15 | 0 | 10:45:07 |
| JNPR | Volume | Rel. Vol. | Bid | Below 10 | 7.9 | 10:45:15 |
| ATHM | Volume | Rel. Vol. | Bid | Above 90 | 100 | 10:45:18 |
| MSFT | Volume | Rel. Vol. | Bid | Below 10 | 8.3 | 10:45:18 |
| SVIN | Buy Pres. | Pressure | Up | 10/10 | 12/14 | 10:45:20 |
| ROBS | Sell Pres. | Pressure | Down | -8/-6 | -8/-7 | 10:45:22 |

SECURITIES MARKET AND MARKET MAKER ACTIVITY TRACKING SYSTEM AND METHOD

TECHNICAL FIELD

The present invention generally relates to real time monitoring and analysis of securities market activity, and, more particularly, to a system and method of tracking and analyzing market maker activity on a dynamic basis for a plurality of securities.

BACKGROUND ART

In a securities market, shares or stock in corporations, commodity futures, currencies and the like are traded over a common system or exchange. For simplicity, however, the following discussion will be limited to the purchase and sale of corporate stock. Within the exchange, traders buy and sell securities using bids and offers (also referred to as asks). More specifically, market makers who are selling securities transmit "offers" or prices and volumes (or associated volumes) at which they will sell various securities, and market makers who are buying securities transmit "bids" or prices and volumes (or associated volumes) at which they will buy various securities. Sellers attempt to sell at the highest possible price and buyers attempt to buy at the lowest possible price. The "inside market" represents the best price for sellers and buyers and respectively is comprised of the lowest ask (also known as the inside ask price or level 1 ask) and the highest bid (also known as the inside bid price or level 1 bid).

To maximize the profit taken from the securities market, traders would like certain information to determine what moment is advantageous to sell or buy a particular security. Traditionally, traders have tracked information derived from the "floor" of exchanges such as the New York Stock Exchange (NYSE), the National Association of Securities Dealers (NASDAQ), the Chicago Mercantile Exchange and the like. This information can be transmitted electronically in near real time (i.e., almost simultaneously with actual market activity) to computer workstations for traders to view and analyze.

The information presently available to traders includes "level 1" information and "level 2" information. Level 1 information for a particular security typically includes, but may not be limited to, the current trade value (i.e., last trade), the current trade volume, the total volume of shares traded during the trading session, the price to earnings (P/E) ratio, the previous trading day's closing value, the present day's opening value, the high and low values for the day and for the previous 52 weeks, the change from the prior closing value, the lowest ask (inside ask), the highest bid (inside bid), the earnings per share, the market capitalization, the dividend paid per share, the dividend yield, news items and articles, and so forth. Also available are records of historical performance, which can be displayed graphically on a trade by trade basis or over periods of time ranging from fractions of seconds to years. Also available are statistics for an entire exchange, such as total volume of shares traded and statistics for calculated market indices, such as the Dow-Jones Industrial Average ("The DOW"), the NASDAQ Composite, the Standard and Poor's 500 ("S&P 500"), the Russell 2000, sector indices, etc.

Level 2 information for a particular security typically includes each market maker having an open (or active) bid or ask, the time when the bid or ask was placed (also referred to respectively as bid time and ask time), size of the bid or ask (i.e., number of shares, often reported in lots of 100) and price of the ask or bid.

Many traders are interested in short term upward or downward price movements for selected securities. Predicting upward and downward price movement is often carried out by observing level 2 information for trends made by market makers as they offer and bid shares of various securities. Typically, level 2 information for one to three securities will be displayed on a computer monitor and this information is intently watched by the trader. The number of securities an individual can track in this manner is limited by the memory and cognitive ability of the individual to assimilate up to tens or hundreds of dynamically updated items of information per security per second. As a result, most traders can only effectively track one security at a time. More skilled traders may be able to track several securities at a time. Nevertheless, this technique is physically and mentally taxing on the trader. In addition, while a trader is tracking one or two securities, a purchase or sell opportunity for a different, untracked security may have been missed.

At least one attempt to automate the analysis of level 2 information has been made. As discussed in U.S. Pat. No. 5,297,032, market depth for a watch list of securities is displayed by identifying the total number of market makers on the inside market for respective bid and offer quotes for each watch list security along with arrows to indicate whether the number of market makers at these prices is increasing, staying the same or decreasing. However, this system does not provide adequate information for a trader to make a decision as to the appropriateness of purchasing or selling a particular security.

Accordingly, there exists a need in the art for a sophisticated securities and market maker activity tracking system.

SUMMARY OF THE INVENTION

According to one aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a statistic indicative of temporary upward or downward price pressure, the statistic derived for each selected security and updated based on the updated data stream, wherein deriving the statistic includes summing the volume of each active bid associated with each selected security and summing the volume of each active ask associated with each selected security.

According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a statistic indicative of temporary upward or downward price pressure, the statistic derived for each selected security and updated based on the updated data stream, wherein deriving the statistic includes determining whether a bid placed by any of the market makers has a value higher than, the same as or lower than the previous bid placed by the same market maker and determining whether an ask placed by any of the market makers has a value higher than, the same as or lower than the previous ask placed by the same market maker.

According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream to derive a statistic indicative of temporary upward or downward price pressure, the statistic derived for a selected market maker and updated based on the updated data stream, wherein deriving the statistic includes identifying each security from a selected set of securities for which the selected market maker has at least one of an active bid or an active ask, and for the selected market maker generating a list of the identified securities along with an indication of the market maker's bid volume and ask volume for the identified securities.

According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a statistic indicative of temporary upward or downward price pressure, the statistic derived for each selected security and updated based on the updated data stream, wherein deriving the statistic includes for each selected security and over a specified time period, determining a bid persistence statistic and an ask persistence statistic for each market maker, the bid persistence statistic determined by calculating the approximate portion of the specified time period that the market maker has had one or more bids being equal to or higher than a level 1 bid for security, and ask persistence that the market maker has had one or more asks being equal to or lower than a level 1 ask for the security According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a statistic indicative of temporary upward or downward price pressure, the statistic derived for each selected security and updated based on the updated data stream, wherein deriving the statistic includes for each selected security and over a specified time period, determining a bid persistence statistic and an ask persistence statistic for each market maker, the bid persistence statistic determined by calculating the approximate portion of the specified time period that the market maker has had one or more bids being equal to or higher than a level 1 bid for the security, and the ask persistence statistic determined by calculating the approximate portion of the specified time period that the market maker has had one or more asks being equal to or lower than a level 1 ask for the security.

According to an additional aspect of the invention, the invention is a method of tracking activity of a plurality of market makers relating to securities traded on at least one common exchange where the market makers place bids and asks. The method including the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and dynamically filtering the data stream, including for each selected security from a selected set of securities, discarding bids having a price lower than the last trade value minus a selected threshold percentage of the last trade value and discarding asks having a price higher than the last trade value plus the selected threshold percentage of the last trade value.

According to yet another aspect of the invention, the invention is a method of tracking activity of a plurality of market makers relating to securities traded on at least one common exchange where the market makers place bids and asks. The method including the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; analyzing the data stream for a selected set of securities from the plurality of securities to derive a set of statistics from the level 2 data indicative of temporary upward or downward price pressure, the statistic derived for each selected security and updated based on the updated data stream; and dynamically sorting a displayed order of the set of statistics based on a parameter selected by the user to reflect current market maker activity.

According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a set of statistics from the level 2 data indicative of temporary upward or downward price pressure, the statistic derived for each selected security and updated based on the updated data stream. The statistic is charted over a period of time for one of the selected securities in a chart.

According to another aspect of the invention, the invention is a method of tracking activity of a plurality of market makers relating to securities traded on at least one common exchange where the market makers place bids and asks. The method includes the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream for a selected set of securities from the plurality of securities to derive a set of statistics indicative of temporary upward or downward price pressure, the statistic derived for each selected security and updated based on the updated data stream. The method also includes the steps of grouping the bids by price to generate a series of bid groups, each bid price group but one containing bids of the same price for the bid price group, the remaining bid price group containing all bids having a price more than a specified number of price changes away from an inside bid price; summing the volume of bids in each bid price group and summing the number of bids in each bid price group; displaying the total volume for each bid price group and the number of bids in each bid price group; grouping the asks by price to generate a series of ask price groups, each ask price group but one containing asks of the same price for the ask price group, the remaining ask price group containing all asks having a price more than a specified number of price changes away from an inside ask price; summing the volume of asks in each ask price group and summing the number of asks in each ask price group; and displaying the total volume for each price group and the number of asks in each ask price group.

BRIEF DESCRIPTION OF DRAWINGS

These and further features of the present invention will be apparent with reference to the following description and drawings, wherein:

FIG. 4A is a block diagram of an analysis result window in a watch list mode;

FIG. 4B is a block diagram of the analysis result window in a market maker's book mode;

FIG. 4C is a block diagram of the analysis result window in a market stocks mode;

FIG. 4D is a block diagram of the analysis result window in a market players mode;

FIG. 4E is a block diagram of the analysis result window in an insider mode;

FIG. 6 is a block diagram of an alert window; and

DISCLOSURE OF INVENTION

Figure 1:
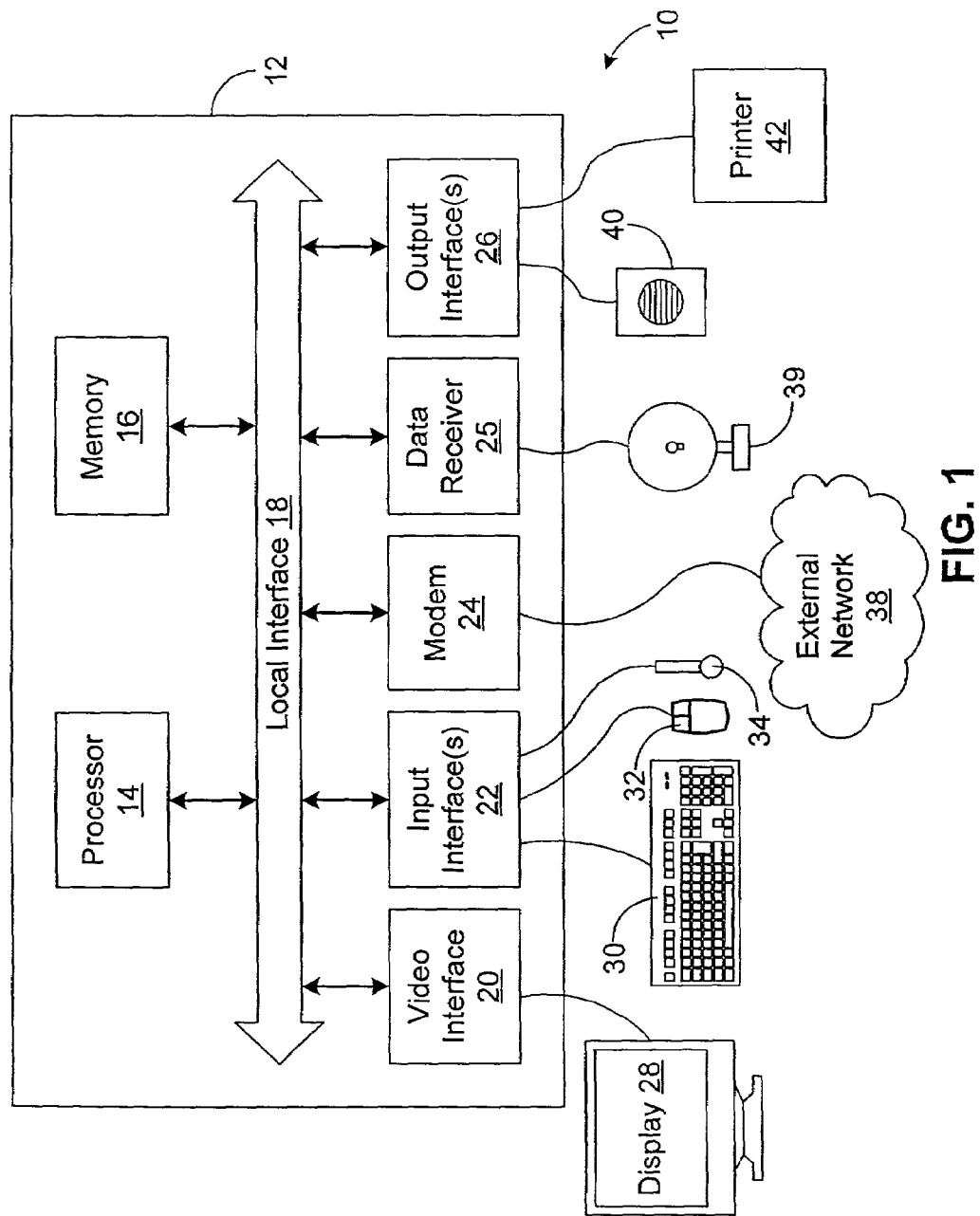
FIG. 1 is a block diagram of a securities and market maker activity tracking system according to the present invention.

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

The present invention relates to a system and associated methods of tracking securities traded over a common market. The system and associated methods assist a user to track and analyze the activity of market makers involved in the purchase and sale of the traded securities. In doing so, the system and associated methods observes market maker activity for trends, or indicators, potentially leading to short term (i.e., a limited duration of time) upward or downward price movement in at least one security. The system and methods use sets of dynamically updated items of information relating to market maker activity and statistics derived therefrom to present the user with information regarding the activity of market makers involved in the purchase and sale of the traded securities.

The system utilizes level 1 and level 2 information to derive indicators of short term upward or downward price pressure for a plurality of securities selected by a user. The level 2 information is filtered by a set of level 2 filters to derive a corresponding number of level 2 data sets. Indicators of upward or downward price pressure are derived from each of the level 2 data sets for each of a plurality of securities. The filters adapt themselves dynamically to current market conditions and will be described in greater detail below.

The information displayed to the user, including the calculated statistics, is dynamically sorted so that with each screen refresh, the displayed information is ordered appropriately for the display method selected by the user.

The system and corresponding methods have at least five operational modes, including a watch list mode, a market maker's book mode, a market stocks mode, a market player's mode, and an insider mode. Each of these modes will be described in great detail below. Briefly, in the watch list mode, the user is presented with bid and ask volume information for a select group of securities and with buy and sell pressure for the selected group of securities. In the market maker's book mode, the user is presented with information regarding the securities for which a selected market maker has active bids and asks. In the market stocks mode, the user is presented with information relating to the securities for which there is heavy bid and ask volume on a market maker by market maker basis. In the market player's mode, the user is presented with information regarding cumulated activity on a market maker by market maker basis. In the insider mode, the user is presented with information regarding the market makers who have been positioned at the inside market for the greatest amount of time on a security by security basis.

The system can be programmed with alert thresholds that are tripped by data values contained within the level 1 or level 2 data stream or tripped by calculated statistics. If an alert is tripped, the user will be notified by the system.

Referring to FIG. 1, a block diagram of a securities and market maker activity tracking system 10, or system 10, according to the present invention is illustrated. As used herein, the term "security" (or "securities") is intended to include, but is not limited to, shares of stocks in corporations, corporate or government bonds, commodity futures, currencies, options, and the all other items traded over a common system or exchange. Briefly, the system 10 is a computer tool having a graphical user interface to assist a securities trader in analyzing information from security markets for opportune times to purchase or sell a particular security. Although the invention has application in tracking and analyzing securities of any type, the following discussion relates to the tracking and analysis of information related to the trading of shares of corporate stock on an exchange or exchanges.

More specifically, the activity of market makers (i.e., placement of bids and asks) is analyzed. Many of the modes of operation described herein are geared to seek out temporary, typically short term (i.e., lasting from several seconds to perhaps as long a several hours), imbalances in individual or collective market maker activity that could lead to a price change in a particular security. These imbalances are also referred to as upward or downward price pressures and may last for few seconds, minutes or hours depending on market conditions.

The system 10 includes a computer system 12. The computer system 12 has one or more processors 14 for executing instructions, usually in the form of computer code, to carry out a specified logic routine. The computer system has a memory 16 for storing data, software, logic routine instructions, computer programs, files, operating system instructions, and the like. The memory 16 can comprise several devices and includes, for example, volatile and non-volatile memory components. Volatile memory components typically do not retain data values upon a loss of power. Non-volatile retain data upon a loss of power. Thus, the memory 16 can include, for example, random access memory (RAM), read only memory (ROM), hard disks, floppy disks, compact disks (including, but not limited to, CD-ROM, DVD-ROM, and CD-RW), tapes, and/or other memory components, plus associated drives and players for these memory types.

The processor 14 and the memory 16 are coupled to a local interface 18. The local interface 18 can be, for example, a data bus with an accompanying control bus, or a network between a processor and/or processors and/or memory or memories. The computer system 12 has a video interface 20, a number of input interfaces 22, a modem 24 and/or a data receiver interface device 25 (the modem 24, the data receiver 25 and any other device for receiving transmitted data, also referred to herein as a receiver or a receiving means), a number of output interfaces 26, each being coupled to the local interface 18.

The system 10 has a display 28 coupled to the local interface 18 via the video interface 20. Although shown as a single cathode ray tube (CRT) type display, multiple displays can be used. Also, the display device can alternatively be, for example, a liquid crystal display (LCD), a plasma display, an electro-luminescent display, indicator lights, or light emitting diodes (LEDs). In addition, the system 10 has several input devices including, but not limited to, a keyboard 30, a mouse 32, a microphone 34, a digital camera (not shown) and a scanner (not shown), each being coupled to the local interface 18 via the input interfaces 22. The modem 24 and/or data receiver 25 can be coupled to an external network 38 enabling the computer system 12 to send and receive data signals, voice signals, video signals and the like via the external network 38 as is well known in the art. The external network 38 may be, for example, the Internet, a wide area network (WAN), a local area network (LAN), direct data link, or other similar network or communications link, including wireless networks. The modem 24 and/or the data receiver 25 can be coupled to receive data from a satellite transceiver 39, coaxial cable, fiber optic cable, etc. It is noted that the system 10 can be accessed and used by a remote user via the external network 38 and modem 24. The system 10 can also include output devices coupled to the local interface 18 via the output interfaces 26, such as audio speakers 40, a printer 42, and the like.

The computer system 12 is programmed to display and execute a securities tracking software tool in graphical user interface (GUI) format. Alternatively, the computer system 12 has logic stored in the memory 16 capable of being executed to display and function as the securities tracking software tool.

In one embodiment of the invention, a server receives a level 1 and level 2 data stream and analyzes the data stream to produce statistics as described herein. The server outputs a data set, including the statistics, to a client terminal over a network or communications link. The client can further process the data sent and generate displays of data to a user.

Figure 2:
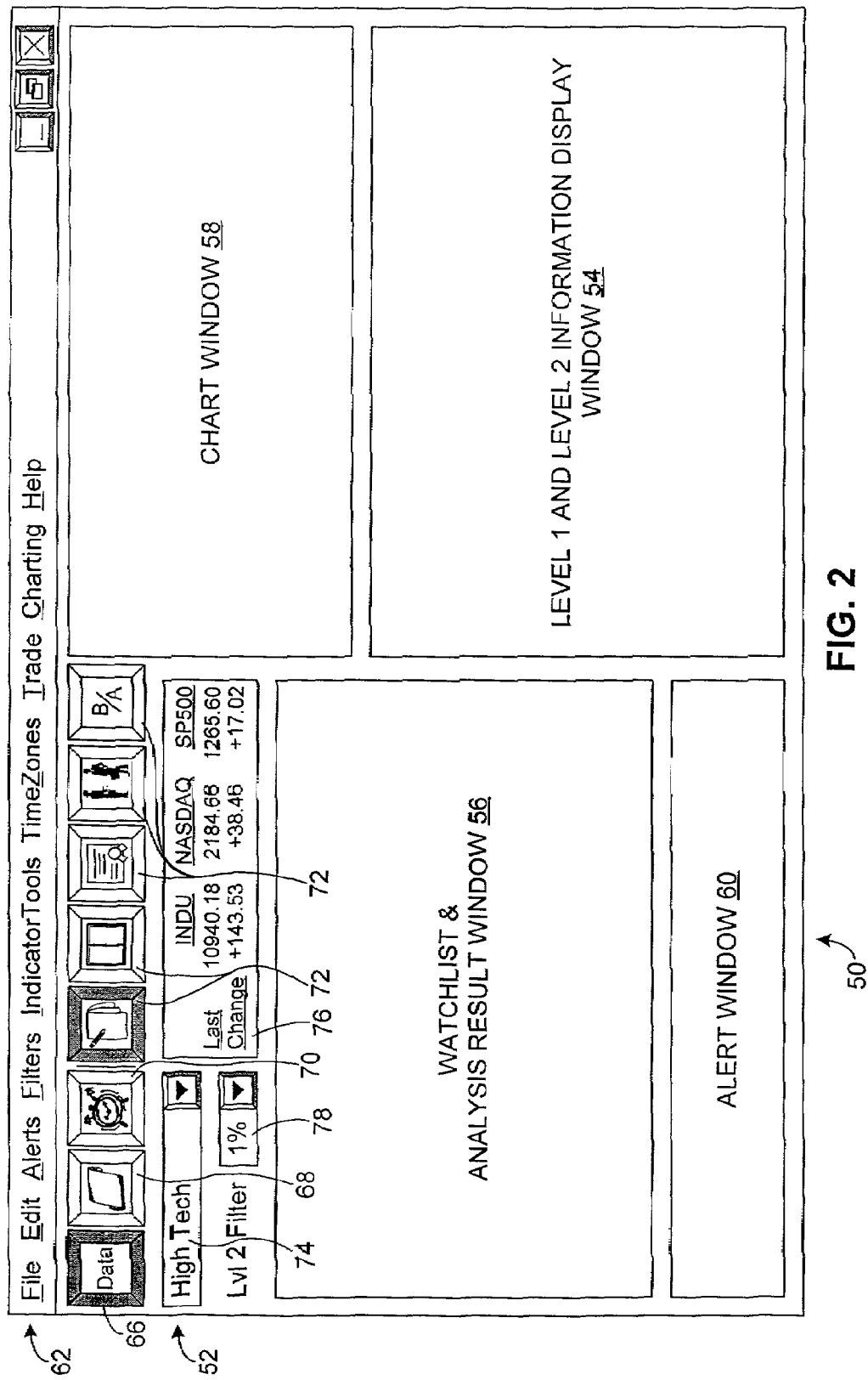
FIG. 2 is a block diagram of a screen shot of displayed information generated by the system of FIG. 1.

With additional reference to FIG. 2, and an exemplary GUI display screen 50 (or screen shot), generated by the securities tracking system 10 and displayed on the display 28 is illustrated. The display screen 50 displays information to a user of the securities tracking system 10. This information is intended to assist the user in deciding which securities to purchase or sell and when to make those purchases and sales. The display screen 50 includes a number of regions for displaying various sets of information and includes an action menu window 52, a level 1 and level 2 information display window 54, an analysis result window 56, a chart window 58, and an alert window 60. The exemplary display screen 50 includes drop-down menus 62 as are known in the art for allowing the user to select various features and functions of the securities tracking system 10.

The action menu window 52 includes function buttons which can be selected by the user by moving a mouse-controlled cursor to the button and pressing a mouse button to select the button displayed on the display screen 50. In addition, keyboard 30 actions and/or voice commands can be used to select various functions and control the system 10. Upon selecting the button, menu item, icon or function (or other command entry mechanism), the securities tracking system 10 carries out logic to invoke a corresponding action.

An exemplary button is a data button 66 for establishing a communications link via the modem 24 or data receiver 25 to a level 1 and level 2 information data service provider. Upon establishing such a communications link, the securities tracking system 10 receives various items of information concerning securities traded at selected exchanges. For example, the user may elect to receive information for securities traded at the New York Stock Exchange (NYSE) and the National Association of Securities Dealers (NASDAQ). For the NASDAQ, there are about 8,000 securities, each being traded and having associated therewith items of level 1 information. This information is updated in real time or near real time (i.e., almost simultaneously with actual market activity) by the data service provider broadcasting signals to the securities tracking system 10. For example, each time a last trade value and volume for any security on the exchange changes, the data service provider will transmit the most recent traded value, trade volume, and trade time for the security to the securities tracking system 10.

Similarly, for securities listed on the NASDAQ, level 2 information is provided from the data service provider to the securities tracking system 10. It is noted that at the time of filing the present application for Letters Patent, NYSE level 2 information is generally not available. However, the concepts and inventions described herein will have equal application to level 2 type information from any exchange, including the NYSE. Level 2 information includes each market maker with an open bid or ask for any security listed on the exchange being tracked. The level 2 information includes the time that the ask or bid was placed (also referred to respectively as an ask time and a bid time), the size of the ask or bid in number of shares (often reported in lots of one hundred), and the value of the bid or ask, all of which is transmitted to the securities tracking system 10 in real time or near real time.

The total amount of transmitted level 2 information will depend on the number of market makers placing bids or asks for any given security at any given time. It has been estimated that between level 1 and level 2 information for NASDAQ, that there are about 400 to about 1,000 items of information which are updated each second. It is also estimated that most of the market activity relates to a small number of securities since certain securities are more widely traded than others. For example, it has been estimated that about 90% of the market activity relates to about 10% of the securities on the NYSE and the NASDAQ. To illustrate this, if one were to track the NASDAQ 50 (i.e., the top 50 securities traded on the NASDAQ), the computer processor capacity needed to track the amount of information being transmitted by the data service provider can be expressed in terms of a variable such as x. In contrast, if one were to track the NASDAQ 150 (i.e., the top 150 securities traded on the NASDAQ), which includes three times the number of securities of the NASDAQ 50, it has been estimated that the processor capacity required to process the information transmitted by the data service provider would be less than 3x (perhaps about 1.5x to about 2x).

The action menu window 52 can also include a watch list set up button 68 to link the user to a GUI screen for selecting and grouping stocks of particular interest to the user. For example, the user can set up various watch lists containing selected groups of securities, such as high tech companies, pharmaceutical companies, retailers, transportation providers, the NASDAQ 50 or 150, the user's favorite securities, and so forth. Within each watch list, securities are specified by ticker symbol.

The action menu window 52 can also include an alert set up button 70 to link the user to a GUI window for setting up various alerts to be triggered by the level 1 and level 2 information and by the results of calculated statistics. Specific alerts will be discussed below in more detail, however, the alerts are used to notify the user of market conditions that could influence the user's decision in purchasing or selling a particular security.

The action menu window 52 also includes mode selection buttons 72 so that the user can select what type of information is displayed in the analysis result window 56. As will be described in more detail below, the analysis result window 56 can display information in at least five modes including, a watch list mode (FIG. 4A), a market maker's book mode (FIG. 4B), a market stocks mode (FIG. 4C), a market players mode (FIG. 4D) and an insider mode (FIG. 4E). These modes are indicated by icons on the display selection buttons 72. In the illustrated example, the watch list mode has a pad of paper indicating a list of items, the market maker's book mode has a notebook icon, the market stocks mode has a stock certificate icon, the market players mode has silhouettes of business people, and the insider mode has a "B/A" (for "bid/ask") symbol.

The action menu window 52 has a drop-down menu 74 for use in selecting one of the various watch lists when the watch list display mode is selected or selecting one of the market makers when the market maker's book mode is selected. General market statistics, market indices and the like can be displayed in a market statistics windows 76 as illustrated.

The action menu window 52 also includes a level 2 filter selection drop-down menu 78 for allowing the user to select a filtration level (or threshold) for the displayed information. Briefly, the level 2 filter is used by the securities tracking system 10 to disregard market maker activity that is more than a selected percentage away from the last reported trade price of each security. This allows the user to confine analysis of market maker activity to those bids and asks that are close to the current market price of each security. Without being bound by theory, it is believed that by monitoring and analyzing market maker activity that is close to the current market price, only the most relevant items of information will be observed and be factored into any decision on purchasing or selling stock in a security. Example filtration thresholds, expressed as percentages, include 1%, 2%, 3%, 4%, and 5%. However, the filter percentage can be defined by the user and need not be an integer (e.g., 2.5%). In addition, the filter can be turned off so that no data relating to market activity is excluded. In one embodiment of the system 10, the incoming data stream is filtered at each possible filtration percentage (including preprogrammed percentages and user defined percentages) regardless of a filtration level selected by the user for displayed data. Corresponding data sets are derived for each of those filtration percentages. The data sets are stored for display as historical market maker activity or for immediate presentation if the user selects a different filtration level for displayed data.

The operation of the filter is dynamic to actively stay current with current market price. As an example of filter operation, if the last reported trade in a stock took place at $20.00 and the level 2 filter for displayed information was set to 1%, then all market maker bids below $19.80 (twenty cents being 1% of $20.00) and asks above $20.20 will be disregarded when displaying data in the information display window 54, when calculating information to be displayed in the analysis result window 56 and/or when generating and displaying alerts. Using the foregoing example, if the next reported ask for the stock is $20.10, the securities tracking system 10 will use the reported ask of $20.10 and then dynamically update the statistics displayed on the display screen 50 and determine if the updated statistics trigger any of the alerts set by the user. If, however, the next ask is $20.50, that ask will be disregarded as it is outside the range of data values allowed by the filter parameters. The filter adjusts itself dynamically based on the last trade value. For example, if, the next reported trade in stock moves to $19.90, all bids below $19.70 would be disregarded and all asks above $20.10 would be disregarded. The system 10 will filter the incoming data stream in the same manner for every other filter level to generate corresponding data sets. As indicated, the data sets are stored for display as historical market maker activity or for immediate presentation if the user selects a different filtration level for displayed data.

The selected securities programmed into the watch lists by the user are stored within a database associated with the user. Statistics for each security in the user's database are calculated regardless of whether the particular security is presently displayed on the display screen 50. This allows the securities tracking system 10 to determine if a programmed alert (also referred to herein as an alarm) has been tripped for any of the securities in the user's database. If an alert is tripped, the alert is displayed in the alert window 60, as described in more detail below. The user can define more than one database to track various sets of securities. However, in a typical mode of operation, only one database can be used at a time. As indicated above, each database can contain multiple watch lists to sub-divide the securities contained in a user's database. In addition, the same security can be included within more than one watch list contained within a database. The overall number of securities that can be contained in a database and processed by the securities tracking system 10 is limited only by the processing and memory capabilities of the computer system 12 being used to execute the securities tracking software tool.

Figure 3:
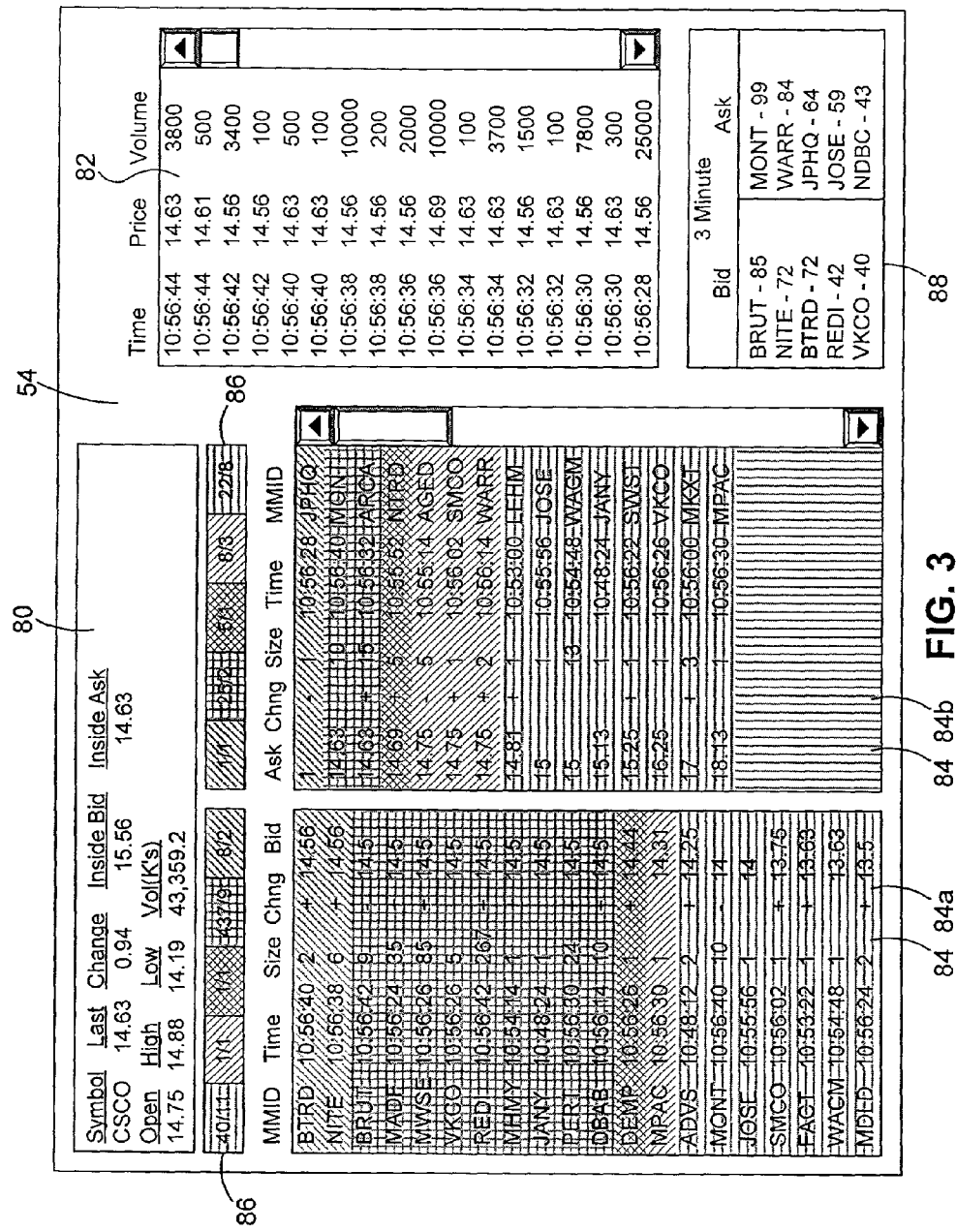
FIG. 3 is a block diagram of a level 1 and level 2 information display window.

With additional reference to FIG. 3, an exemplary level 1 and level 2 information display window 54 is illustrated. The information display window 54 displays level 1 and level 2 information for a selected security. In one embodiment, the security for display in the information display window 54 can be selected by the user by using mouse actions to select one of the securities identified in the analysis result window 56 or the alert window 60. In the illustrated example, Cisco Systems (ticker symbol CSCO) is displayed. The information display window 54 includes a basic level 1 information window 80 displaying selected items of level 1 information for the selected security. For example, in the illustrated example, the basic level 1 information window 80 contains the last trade value for the security, the change from the previous day's trading close, the value at the commencement of trading for the present trading day, the days high and low values, the volume of shares exchanged for the trading session so far, the inside bid and the inside ask. The information display window 54 also contains a trade list window 82 showing the time, price and volume of each trade for the displayed security.

The information display window 54 also has a pair of market maker lists 84. A first market maker list 84a identifies market makers by a four character market maker identifier who are placing bids on the displayed security under the heading "MMID" (short for "market maker identifier"). A second market maker list 84b shows market makers placing asks on the displayed security. Also displayed in the market maker list 84 is the time of the bid or ask, the size of the bid or ask in share lots of 100, and the bid or ask price. Bids having the same price are grouped together and displayed with a colored background or, as illustrated, a patterned background. Bids below a certain threshold (e.g., four or more price changes away from the highest bid) are grouped together at the bottom of the list 84a. Similarly, asks having the same value are grouped together and displayed with a certain color or patterned background. Asks with a price that is four or more price changes away from the lowest ask are grouped together.

As an indication of market depth, bar charts 86 are provided to give the user an indication of how many market makers have open (or active) bids or asks at various price levels. The bar charts 86 contain generally equally sized blocks having colors or patterns corresponding to those used in the market maker lists 84. For each price group, the number of shares being bid or offered is identified followed by the number of market makers at that price point. For example, in the illustrated information display window 54, two market makers are bidding $14.56 for a total of 800 shares. This information is displayed as "8/2" (for eight hundred shares among two market makers) in the corresponding bar chart 86. It is noted that the level 2 filter can be applied to the information displayed in the market maker lists 84 and bar charts 86 and, as a result, bids or asks deemed too far away from the last trade price will be omitted from the market maker lists 84 and bar charts 86.

As one skilled in the art will appreciate, the information displayed in the information window 54 is dynamically updated as data relating to market maker activity is transmitted to the system 10. The illustrated information display window 54 of FIG. 3 only captures an instant of time. The same is true for the data, information and statistics displayed in the analysis result window 56, the alert window 60, the chart window 58 and so forth.

As one skilled in the art will appreciate, information transmitted by the level 1 and level 2 information service provider and received by the securities tracking system 10 can be in error on occasion. FIG. 3 illustrates at least one such error in the second market maker list 84b where an ask price of $1.00 is displayed in association with the market maker JPHQ. Depending on the level 2 filter selected by the user, this error may be filtered out. However, if the level 2 filter is not turned on or if the error falls within the range of values retained after filtration, then the erroneous data value will be displayed on the information display window 54 and entered into any statistical calculation performed by the securities tracking system 10.

Other information can also be filtered from display and entry into the statistical calculations of the system 10. For example, a crossed market filter can be used to remove bids that are higher than the level 1 bid and asks that are lower than the level 1 ask. These bids and asks are usually old bids or asks that were not purged. In this manner, the level 1 data is used to verify the accuracy of the level 2 data. In the foregoing example, if the crossed market filter were turned on, the $1.00 ask by JPHQ would be filtered out.

The securities tracking system 10 tracks the value of each bid and ask for each market maker for each security. The next time a market maker places a bid for the security, the securities tracking system 10 calculates whether that bid is higher or lower than the market maker's previous bid for that security. If the value is higher, a plus sign is placed in a change column on the first market maker list 84a. If the value is lower, a minus sign is placed in the change column. If there is no change from the previous bid, the change column is left blank in the row associated with the market maker. For example, in the first market maker list 84a the market maker BTRD has entered a bid of $14.56 which is higher in value than BTRD's previous bid for Cisco Systems. Thus a "+" sign is displayed in the change column for BTRD. Similarly, the next time a market maker places an ask for the security, the securities tracking system 10 calculates whether that ask is higher or lower than the market maker's previous ask for that security. If the value is higher, a plus sign is placed in a change column on the second market maker list 84b. If the value is lower, a minus sign is placed in the change column. If there is no change from the previous ask, the change column is left blank in the row associated with the market maker. For example, the market maker MONT placed an ask of $14.63 which is less than MONT's previous ask for Cisco Systems. Thus, a "−" sign is displayed in the change column for MONT. As will be described in more detail below, these changes are aggregated by the securities tracking system 10 to indicate upward or downward price pressure for the securities contained in the user's database.

The information display window 54 can also include an insider aging window 88. Information displayed in the insider aging window 88 is linked to the insider mode and will be described in greater detail below.

Referring back now to FIG. 2, the analysis result window 56 is used to display statistics which are derived from current market activity. It is noted that the statistics are continually updated and resorted based on the incoming data stream and as described in greater detail herein. The statistics are calculated based on the incoming level 1 and level 2 data received over the communications link established with the level 1 and level 2 data service provider. In one embodiment, the displayed information presented on the display screen 50 is written to the screen according to a user controlled refresh rate. Refreshing the screen periodically, rather than continuously, reduces burdens on the computer system 12, thereby enhancing performance of the securities tracking system 10. Example refresh rates include four times a second, twice a second, once a second, every two seconds, and the like.

As discussed above, the statistics for display on the analysis result window 56 are derived from the filtered data set as filtered by the level 2 filter and the crossed market filter. In addition to the level 2 filter and the crossed market filter, a bad data item filter (or bad tick filter) can be used to remove items of information which were erroneously entered by operators of the stock exchange databases and subsequently transmitted by the data service provider to the securities tracking system 10. The bad data filter can remove items of information which deviate significantly from surrounding price events for the same security. For example, a bid, ask or trade price deviating more than 10% from an average of the last ten similar events can be excluded. Another example of the bad data filter includes a filter which removes any items of price information (i.e., a bid quote, an ask quote or a trade price) which deviate from corresponding recent price information by about a multiple of 10 or 100. Such a data item indicates that a decimal point was erroneously typed in the price information or that a decimal place was omitted. For example, if a particular stock is trading at about $50.00 per share and a bid of $5.00 is received, the filter can remove that data item. Another bad data filter is a filter which removes items of price information which deviates by one integer in a price's dollar, tens or hundreds position. For example, if a security has been trading at about $23.00 a share, a data value of $22.00 a share or $24.00 a share can be disregarded.

With additional reference to FIG. 4A, the analysis result window 56 is illustrated when the securities tracking system 10 is placed in the watch list mode by the user. In this mode, the analysis result window 56 displays a table 56a identifying each security in the selected watch list. Selective information derived from the level 1 and level 2 information is displayed in association with each ticker symbol contained in the watch list. This information can include relative volume of bids and asks (column 90), an indication of buy or sell pressure (column 92), the number of market makers having open bids or asks (column 94), the actual volume of bids and asks reported in share lots of 100 (column 96), and pressurized volume (column 98). It is noted that all displayed statistics are derived from data after application of the user selected level 2 filter, and/or crossed market filter, refreshed on the display screen 50 at a desired refresh rate and dynamically sorted as discussed below.

To calculate actual volume displayed in column 96, the system 10 respectively sums the size of each bid and the size of each ask for all of the filtered market makers having open bids or asks within the filter thresholds for each security. In addition, the securities tracking system 10 counts the number of market makers having open bids and the number of market makers having open asks within the filter thresholds for display in column 94. In the illustrated example, Apple Computer (i.e., ticker symbol AAPL) has 38 market makers with open bids totaling 9,300 shares of bid volume and has 42 market makers having open asks for an aggregate of 16,000 shares of ask volume.

The relative volume of bids for each security (column 90) is calculated by dividing the actual bid volume by the sum of the actual bid volume and the actual ask volume to arrive at a percentage. Similarly, the relative volume of asks is derived by dividing the actual ask volume by the sum of the actual bid volume and the actual ask volume. This relative volume calculation can indicate whether there is significant purchase or sell pressure for a given security. For example, in the illustrated example, Cisco Systems (ticker symbol CSCO) has 88.4% of the aggregate volume of shares for bid and only 11.6% of the aggregate volume of shares for sale. As a result, the demand for the security heavily outweighs the availability of the security. Therefore, one may speculate that the value of the security should rise. In contrast, in the illustrated example, Worldcom (ticker symbol WCOM) has a relative volume of bids of 17% and a relative volume of asks of 83%, indicating that a significantly greater of number of traders desires to sell Worldcom rather than purchase Worldcom. Therefore, one may speculate that the value of the security should fall. In this manner, traders can observe market activity to identify imbalances in market maker activity to identify advantageous moments for the execution of a trade. On the other hand, the information can illustrate to a trader when market activity is relatively balanced for a particular security. For example, Microsoft Corporation (ticker symbol MSFT) has a relative bid volume of 46.8% and a relative ask volume of 53.2%. This may indicate that the price for Microsoft stock, at least at the moment, may be relatively stable. As one of ordinary skill in the art of stock trading will appreciate, these calculations and the other calculations described herein are only indicators and cannot be fully relied upon to predict variations in a security's value. Trading securities is inherently risky and there is never a guarantee of how much money one can make or lose by engaging in such endeavors.

The securities tracking system 10 also displays respective buy and sell pressure values in column 92. More specifically, the securities tracking system 10 counts the number of bidding market makers who have increased their bid price (i.e., the number of plus signs in list 84a). This number is reduced by the number of bidding market makers who have decreased their bid price (i.e., the number of minus signs in list 84a). The result is displayed as buy pressure in column 92. Similarly, the securities tracking system 10 counts the number of offering market makers who have increased their ask price (i.e., the number of plus signs in list 84b). This number is reduced by the number of offering market makers who have decreased their ask price (i.e., the number of minus signs in list 84b). The result is displayed as sell pressure in column 92.

Alternatively, buy and sell pressure can be expressed in ratio format, or as relative pressure percentages. Relative buy pressure is computed by dividing the buy pressure value by the sum of the buy pressure value and the sell pressure value. The relative sell pressure is calculated by dividing the sell pressure value by the sum of the buy pressure value and the sell pressure value.

When the buy pressure and the sell pressure are each close to zero (for example, buy/sell pressure of 0/0, 1/2, or −2/−3) the user may speculate that there is very little upward or downward price pressure on the security. However, large positive numerical values for buy and/or sell pressure indicate that the market makers are increasing their bid and ask price for the security. Conversely, large negative buy and/or sell pressure values would indicate that there is downward price pressure for this security as the market makers are lowering their bid and ask values. In situations where buy pressure is a positive number and sell pressure is a negative number, there is an indication that the price differential between bids and asks is narrowing as market makers placing bids are increasing their bid price and market makers offering shares of the security are decreasing their ask price. On the other hand, a negative value for buy pressure and a positive value for sell pressure would indicate a widening of the spread between bids and asks.

The securities tracking system 10 can also display pressurized volume. More specifically, the securities tracking system 10 sums the bid volume associated with each bid from the bidding market makers who have increased their bid price. This number is reduced by the sum of the bid volume associated with each bid from the bidding market makers who have decreased their bid price. The result is displayed as bid pressurized volume in column 98. Similarly, the securities tracking system 10 totals the ask volume associated with each ask from the offering market makers who have increased their price. This number is reduced by the ask volume associated with each ask from the offering market makers who have decreased their ask price. The result is displayed as ask pressurized volume in column 98.

The concept of pressurized volume allows the user to determine if a large number of shares being bid and/or offered are moving upward or downward in price. Pressurized volume can also be considered as a weighted indication of buy pressure and/or sell pressure. This weighted indication of buy pressure and/or sell pressure accounts for the volume associated with the bids and asks which have recently changed in price for each associated market maker. The pressurized volume, therefore, indicates to the user when a large volume of shares, either by one market maker or a number of market makers collectively, moves in price. By way of example, a user may not be very interested to know that a few lots of 100 shares offered by a handful of market makers has moved in ask price, but would be interested in knowing if, for example, 50 or more lots of 100 shares being bid or offered moves in price.

In the illustrated example, actual pressurized volume is illustrated in column 98. However, additional or alternative methods of indicating pressurized volume are contemplated by the invention. For example, relative pressurized volume can be displayed (i.e., the bid pressurized volume divided by the total pressurized volume and the ask pressurized volume divided by the total pressurized volume and respectively reported as a percentage). In another embodiment, pressurized volume can be reported as a percentage of total bid and/or ask volume (i.e., dividing the bid pressurized volume of the illustrated example by total bid volume for the security and dividing the ask pressurized volume of the illustrated example by total ask volume for the security, and respectively reporting the results as percentages). As another example, bid pressurized volume can be broken down into volume associated with increasing bids and decreasing bids. Similarly, ask pressurized volume can be broken down into increasing asks and decreasing asks. These broken down totals can be reported in a variety of ratio formats as desired by the user.

The user may visually configure the analysis result window 56 in a number of different ways. For example, some of the columns need not be displayed. In another example, the listed securities can be displayed in an order according to one of the calculated parameters rather than in alphabetical order according to ticker symbol as illustrated. For example, a trader may be interested in showing the security with the most total bid volume first. This can be accomplished by using keyboard 30 or mouse 32 actions to select the bid heading in the actual volume column 96. Alternatively, the securities can be displayed by total bid and ask volume, ask volume, total number of market makers, number of market makers with open bids, number of market makers with open asks, by relative bid volume, by relative ask volume, by buy or sell pressure, or by buy or sell pressurized volume. In another embodiment, selected columns can replace one another upon invoking a keyboard 30 or mouse 32 action. For example, the table 56a can show the relative volume column 90, the market maker column 94 and the actual volume column 96 for each security in the watch list and suppress display of the buy and sell pressure column 92 and the pressurized volume column 98. Upon invoking the keyboard 30 or mouse 32 action (e.g., right clicking on one of the particular columns), the selected column will be replaced by a suppressed column.

The securities tracking system 10 will also update the displayed information using dynamic sorting. With the exception of the chart window 58 (described below) most of the information presented to the user is in the form of tables. As indicated, each table can be sorted by selecting the words identified at the top of each column by invoking a keyboard 30, mouse 32, or voice command. In addition, the tables are periodically refreshed to show information relating to current market activity. The tables and chart(s) can be refreshed continually as new data is received and statistics are calculated. Alternatively, to conserve computer system 12 resources, the tables and chart(s) shown on the display screen 50 can be refreshed at periodic intervals such as every quarter second, every half second, every one second, every two seconds, every four seconds, or the like. At the time of refreshing the display screen 50, the tables are re-ordered row by row to properly display the data in the manner selected by the user. For example, if the user has selected to view table 56a by placing the securities tracking system 10 in the watch list display mode and the user has selected to display the information in table 56a by relative bid volume, at each refresh the stocks will be ordered such that the highest relative bid volume stock will appear first, followed by the second highest relative bid volume stock and so forth (even if a different order of stocks were displayed before the refresh). The user can select to turn off this dynamic sorting feature of the present invention so that updated information will be displayed, but in the row by row order in which the rows were before the refresh.

In addition to displaying updated statistics of current market activity, the securities tracking system 10 stores historical statistics relating to market activity for each stock in the user's database. More specifically, this information is stored and can be charted in the chart window 58 in various manners discussed below. Briefly, the stored information includes actual bid and ask volume, number of bidding and offering market makers, buy and sell pressure, relative bid and ask volume, and pressurized bid and ask volume (alternatively, certain statistics can be re-calculated as needed from historical records). Historical records are also stored for information described below when the securities tracking system 10 is placed in the market maker's book mode or the market players mode, the market stocks mode and the insider mode. This additional information also includes each bid and ask placed by each market maker for each security so that charts indicating the extent to which a particular market maker is supporting a particular security or sector. For example, over the course of a period of time it may become clear that a particular market maker has been offering a large number of shares at prices close to the last trade value in order to sell off at least a portion of that market maker's ownership in a particular security. To assist the user in discerning this information, the market maker's activity can be charted in the same chart along with other information, including, for example, actual trade values, actual volume, and/or an average of bid or ask volumes for all market makers for the security.

Referring now to FIG. 4B, the analysis result window 56 is illustrated when the user places the system 10 in the market maker's book mode by selecting the book display selection button 72 (FIG. 2). The table illustrated in FIG. 4B will be referred to as table 56b. While in the market maker's book mode, the securities tracking system 10 will change the content of the drop-down menu 74 to reflect a list of market makers from which the user can select a specific market maker. Table 56b will present information allowing the user to track activity of the selected market maker, or the "market makers book."

The securities for which the selected market maker has an active bid or ask within the filtration thresholds selected by the user will be displayed by ticker symbol in table 56b. For each of those securities, the actual volume being bid or offered by the selected market maker will be displayed in an actual volume column 100. As illustrated, the actual volume column 100 has two sub-columns categorized by bids and asks. These volumes are specific to the selected market maker are also displayed as relative volumes in a relative volume column 102. The relative volume of bids is calculated by dividing the actual bid volume by the sum of the actual bid volume and the actual ask volume. The relative ask volume is calculated by dividing the actual ask volume by the sum of the actual bid volume and the actual ask volume. Also displayed is a column 104 identifying the market maker's bid and ask prices for each security. It is noted that presently available level 2 information is limited to the best bid and the best offer of each market maker for each security, except for some electronic market makers who make available all of their bids and offers for each stock. Therefore, the information presented in table 56b is corresponding limited. Should information concerning all bids and all offers of each market maker for each security become widely available, the system 10 can be modified as will be apparent to one skilled in the art to generate statistics relating to all bids and asks in each market maker's book.

Similar to table 56a, the information displayed in table 56b can be sorted by any of the displayed columns or sub-columns. In addition, selected columns can be hidden from view or brought into view by the user. The information can be dynamically sorted as described above so that upon each display screen 50 refresh, the rows will be listed in order according to the present market maker activity. As indicated above, market maker bidding and offering activity is stored by the system 10 so that the charts relating to market maker activity for a particular security can be displayed. It is also noted that the user can display level 1 and level 2 information for a selected security in the level 1 and level 2 information display window 54 by selecting the security from the list presented in table 56b.

Referring now to FIG. 4C, the analysis result window 56 is illustrated when the system 10 is placed in the market stocks mode. Entry into the market stocks mode can be accomplished by the user selecting the appropriate display selection button 72. The table illustrated in FIG. 4C will be referred to as table 56c. In the market stocks mode, the system 10 identifies the market makers with the highest combined bid and ask volume for any security in the user's database as within the filtration level selected by the user. The market maker identifiers are displayed in a MMID column 106. Also displayed in column 108 for each security is the actual bid and ask volume generated by the identified market maker listed in column 106. Relative volume is calculated from the values in column 108 and displayed in a relative volume column 100. More specifically, for each security and market maker pair, the market maker's actual bid volume is divided by the sum of the market maker's actual bid volume and actual ask volume to arrive at a relative bid volume and the market maker's actual ask volume is divided by the sum of the market maker's actual bid volume and the actual ask volume to arrive at a relative ask volume.

In the illustrated example shown in FIG. 4C, the securities have been arranged by total actual volume. That is, the sum of the bids and asks for each reported market maker are totaled and arranged in descending order. It is noted that this total is not shown in the illustrated example, but can be shown if desired. As with tables 56a and 56b, table 56c can be arranged in various orders by the user selecting one of the various column or subcolumn (e.g., bid or ask) headings. Selecting any of the ticker symbols using a mouse, keyboard or voice command will display the associated level 1 and level 2 information for that security in the level 1 and level 2 information display window 54. Selecting any of the market maker identifiers in column 106 using a mouse, keyboard or voice command will display the associated market maker's book (table 56b) in the analysis result window 56. In addition, table 56c can be dynamically sorted with each display screen 50 refresh as described above.

As indicated above, each security in the user's database can be identified multiple times in table 56c. In the illustrated example, ticker symbol SSCC is identified as the fourth and fifth entries in the table. The first entry for SSCC is for the market maker with the fourth highest combined bid and ask volume for any security in the user's database (ARCA with 35,300 shares bid and 100 shares offered for SSCC) and the second entry for SSCC is for the market maker with the fifth highest combined bid and ask volume for any security in the user's database (REDI with 1,000 shares bid and 31,700 shares offered for SSCC).

As one skilled in the art will appreciate, other display methods for displaying information related to market maker activity in the market stock display mode is possible. For example, the identified market maker's bid and/or ask price can be listed and the securities tracking system 10 can identify whether this price is the highest bid or the lowest ask. In another embodiment, table 56c can include one entry for each security and the market maker identifier for the market maker having the highest bid volume and the market maker having the highest ask volume in two separate columns.

The information displayed in table 56c assists the user in determining when a particular market maker is attempting to purchase or sell a large amount of shares in a particular security. This information is collected so that charts of historical market maker activity can be generated and displayed.

Referring now to FIG. 4D, the analysis result window 56 is illustrated when the user places the system 10 in the market player's mode by selecting the market player's selection button 72 (FIG. 2). The table illustrated in FIG. 4D will be referred to as table 56d. In the market player's mode, the system 10 separately sums the bid volume and the ask volume for all of the securities for which each market maker has an open ask or an open bid within the filtration level selected by the user. These values are respectively reported in column 112 of table 56d. In the illustrated example, the market makers are listed in order of total volume, that is, the combined bid volume and ask volume associated with each market maker. As one skilled in the art will appreciate, table 56d can be ordered according to any of the other columns or subcolumns (for example, by bid or ask volume). The actual volumes of column 112 are converted to relative volumes in the manner described above and reported in column 114.

The system 10 will also calculate the buy pressure and sell pressure specific to each market maker. More specifically, the system 10 will sum the number of bids for which the market maker has increased their price and reduced that number by the number of bids for which the market maker has reduced their price to derive market maker buy pressure total. Similarly, the system 12 will calculate sell pressure by summing the number of asks for which the market maker has increased their price and reduce that number by the number of asks for which the market maker has reduced their price and display the total as market maker sell pressure. market maker buy and sell pressure is displayed in column 116.

Similarly to table 56a, the information displayed in table 56d can be sorted by any of the displayed columns or subcolumns. In addition, selected columns can be hidden from view or brought into view by the user. The information can be dynamically sorted as described above so that upon each display screen 50 refresh, the market makers will be listed in order according to the present market maker activity. As indicated above, the statistics calculated by the system 10 for table 56d can be stored so that charts related to market maker activity can be displayed. It is noted that the user can display a selected market maker's book (table 56b) by selecting the corresponding market maker identifier from the list presented in table 56d.

Referring now to FIG. 4E, the analysis result window 56 is illustrated when the user places the system 10 in the insider mode by selecting the corresponding insider button 72 (FIG. 2). The table illustrated in FIG. 4E will be referred to as table 56e. The insider mode is used to display statistics calculated by the system 10 which are indicative of a market maker's persistence at the inside market. More specifically, when a market maker desires to add a position, that market maker needs to be one of the most aggressive bidders. Conversely, when a market maker desires to sell a position, the market maker needs to be one of the most aggressive offering market makers for that security. In some situations, a market maker may desire to conceal activity relating to one or more securities by only placing bids or asks of small volumes persistently at or near the inside market. As an example, over the course of three days in the year 2000, Goldman Sachs sold off a very large position in World Corn (ticker symbol WCOM) stock by offering 1,000 or fewer shares at a time at prices that were at or near the lowest ask price. The index mode is intended to assist in apprizing the user of this type of aggressive purchase or sell action by one or more market makers.

The system 10 uses a market maker persistence statistic akin to a moving average, or exponential smoothing, to track market maker presence at the inside market. The persistence statistic is expressed as a percentage and is approximately the percentage of the time a particular market maker has had the most aggressive bid or the most aggressive ask for any particular security over a specified period of time. The persistence statistic can be calculated for any period of time. In the illustrated example, column 118 reports the persistence statistic for a three-minute interval by security (column 122) and by market maker (column 124). Column 120 displays the persistence statistic for a fifteen-minute interval for the same security/market maker pairs. In the illustrated example, the securities are sorted by most aggressive bidder based on the three-minute interval period.

In the illustrated example, Siebel Systems (ticker symbol SEBL) is associated with the market maker most aggressively bidding for any of the stocks over the last three minutes. More specifically, approximately 37.3% of the time the market maker identified by NFSC had the highest bid for Siebel Systems. Over the same three minutes, NFSC had the lowest ask for approximately 0.2% of the time. Over a fifteen-minute interval NFSC had the highest bid for SEBL approximately 11.9% of the time and the lowest ask approximately 0.2% of the time.

As one skilled in the art will appreciate, there are a number of possible approaches for calculating how long a particular market maker is at the inside market for any particular security. An exemplary approach involves breaking the time period (e.g., three minutes, fifteen minutes, an hour, a trading session, or the like) into a plurality of segments. Each segment has a known duration, such as a quarter of a second, a half of a second, one second, two seconds, four seconds, or the like. The rate at which the period is broken into segments is referred to herein as an index rate. The index rate can be the same as the refresh rate for refreshing information displayed on the display screen 50, but need not be the same as the refresh rate.

For both bids and asks and for each segment of time, each market maker is given a value of either one or zero for each security in the user's database. On the bid side, a bid value of one is assigned to any market maker for the segment/security if the market maker's level 2 bid is equal to or higher than the level 1 bid for the security (i.e., the inside market bid). On the ask side, an ask value of one is assigned to any market maker for the segment/security if the market maker's level 2 ask is equal to or lower than the level 1 ask for the security (i.e., the inside market ask). A bid value of zero is assigned to each market maker for any segment of time for which the market maker does not have a level 2 bid that is equal to or higher than the level 1 bid. An ask value of zero is assigned to each market maker for any segment of time for which the market maker does not have a level 2 ask that is equal to or lower than the level 1 ask for that stock. One skilled in the art will appreciate that more than one market maker can be at the inside market during any given segment, each being assigned an appropriate bid or ask value of one for the segment.

The bid and ask values for each market maker and each security are tracked over the period of time and can be converted into a percentage by numerically summing all of the bid values assigned to each market maker on a security by security basis and dividing that number by the number of segments in the period and summing all of the ask values assigned to each market maker on a security by security basis and dividing that number by the number of segments in the period.

According to another embodiment of the invention, an exponentially smoothed persistence percentage is calculated by separately summing each bid or ask according to an exponential average where the current sum of all values ($\Sigma$VALc) is calculated according to equation 1 as follows:

$$\sum VALc = \left( \sum VALp + \frac{CV - \sum VALp}{m} \right) \quad \text{Eq. 1}$$

In equation 1, m is the number of segments in the period, CV is the current value assigned to the market maker and $\Sigma$VALp is the prior sum of all values calculated according to equation 1 one segment earlier. The $\Sigma$VALc value is multiplied by 100 to arrive at a percentage, that percentage representing the exponential average of the aggregation of each bid or ask value for the market maker for a selected security over the time period of interest. The equation is solved separately for bid and ask values.

As an example, the index rate is set to assign a bid and ask value every second. Therefore, over a three minute time period, there are 180 segments (three minutes times sixty segments per minute). If a particular market maker has a level 2 bid at or higher than the highest level 1 bid for a security for 90 of those segments, the ΣVALc would approach 0.50. If the current value assigned to the market maker is one, indicating that at the current time segment the market maker has a bid equal to or higher than the highest level 1 bid, the second term of the equation will increase the persistence percentage slightly. In the example, the persistence percentage would be about 50.3%. As one skilled in the art will appreciate, a solution for equation 1 for each market maker, for each stock, for each time period of interest, will be solved for both bids and asks. The solution is an approximation to the percentage of time the market maker spends at the inside market and results in a means of calculating an exponential moving average for the market maker's time spent at the inside market. The resulting persistence statistic can be which could be graphed for the time period or weighted against the volume of the associated bids and asks from the market maker.

As one skilled in the art will appreciate, other formulas can be used to measure the persistence, or percentage of time, that a market maker has a bid equal to the inside bid or an ask equal to the inside ask.

As one skilled in the art will appreciate, certain securities that are not widely traded may have one or more market makers continually placing a bid or an ask for the security until a seller or buyer becomes available. This may take a considerable amount of time (e.g., minutes to days) and skew the results prescribed in table 56c. Therefore, the user can activate a filter to discard certain securities from the insider mode statistics. The filter disregards securities having a trade volume below a certain threshold. The volume threshold can be the trade volume from the previous trading day or an average traded volume for the security. The threshold is user definable and can be established globally or for selected securities.

Similar to table 56a, the information displayed in table 56e can be sorted by any of the displayed columns or subcolumns. In addition, selected columns can be hidden from view or brought into view by the user. The information can be dynamically sorted as described above so that upon each display screen 50 refresh, the rows will be listed in order according to the present market maker activity. As indicated above, data associated with table 56e market maker bidding and offering activity is stored by the system 10 so that charts relating to market maker activity for any particular security can be displayed. It is also noted that the user can display level 1 and level 2 information for a selected security in the level 1 and level 2 information display window 54 by selecting the security from the list presented in column 122 of table 56e. The user can display a market maker's book (table 56b) by selecting the market maker identifier in column 124 of table 56e.

Referring back now to FIG. 3, the insider aging window 88 will be described in more detail. The illustrated example of the insider aging window 88 is a three-minute window, however, other time periods or additional time periods can be depicted in the same manner in the insider aging window 88. For the security displayed in the information display window 54 and for the time period of interest, the insider aging window 88 displays the market makers who have been the most aggressive in placing bids or asks. The market makers are reported by market maker identifier followed by the approximate percentage of the time period (as calculated by the persistence percentage equation) the market maker has been at the inside market over the time period. As with the other tables displaying information to the user, the insider aging window 88 can be displayed using dynamic sorting to appropriately reorder the lists of market makers displayed in the insider aging window 88 based on current market maker activity.

Figure 5A:
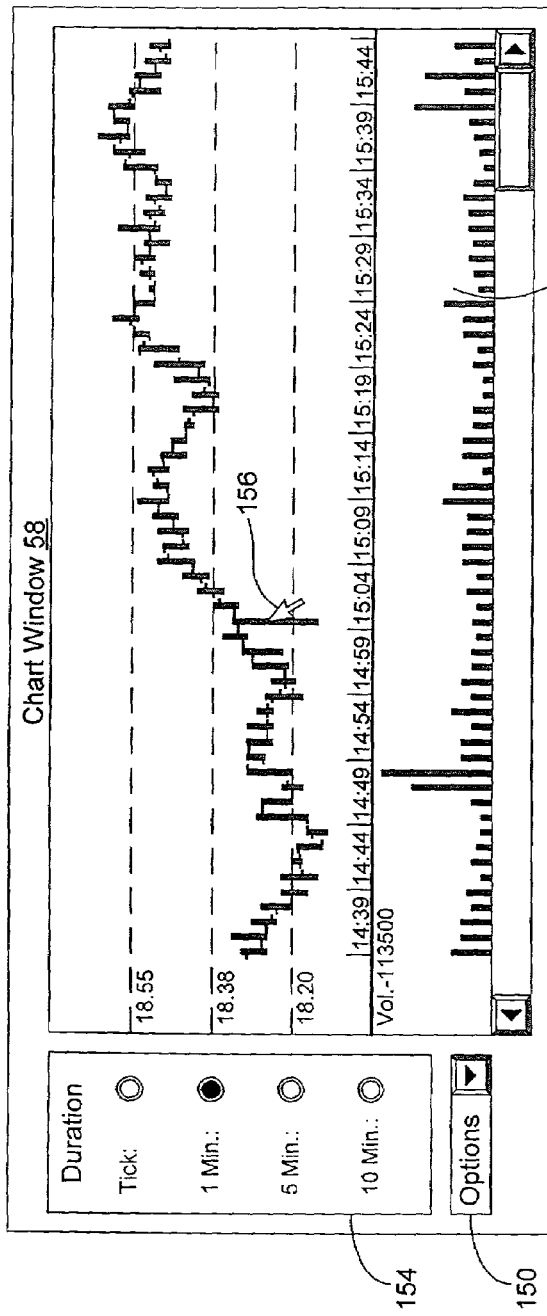
FIG. 5A is a block diagram of a chart window.

Referring now to FIG. 5A, the chart window 58 is illustrated in more detail. The illustrated chart window 58 shows the values at which a particular security has been traded, the time of those trades and the volume of the trades for a one minute time period. It is noted that when a particular stock is selected from either the analysis result window 56 or the alert window 60, a chart corresponding to that stock will be displayed in the chart window 58. Therefore, the chart displayed in the chart window 58 will usually correspond with the information displayed in the level 1 and level 2 information displayed in the information display window 54. However, at certain times, the chart may not correspond to the information displayed in the information display window 54, such as if the chart window 58 is used to display sector indices or a particular market maker's activity.

The chart window 58 has a first menu 150 in the form of a drop down box for selecting the type of chart to be displayed, such as actual trading activity as shown in the illustrated example in a graphing subwindow 152. The first menu 150 also includes choices to select among graphs of historical information on a securities by securities basis or a market maker by market maker basis. Example graphs include historical collections of data for the values derived for table 56a displayed when the securities tracking system 10 is placed in the watch list display mode. These graphs can include charts of net volume, relative volume, bid and/or ask volume, net or relative buy and/or sell pressure, net or relative pressurized volume, and so forth. As indicated earlier, additional charts can be constructed based on specific market maker activity. These graphs include graphs of historical information calculated when the securities tracking system 10 is placed in any of the market maker book mode, the market stocks mode, the market players mode, and the insider mode.

A second menu 154 is provided so that the user can select the duration for which the selected information will be displayed. For example, information can be displayed on a tick-by-tick basis, on a minute-by-minute basis, on a five-minute basis or on a ten-minute basis. One skilled in the art will appreciate that other time periods can be charted, such as by hours, days, months, quarters or years. A scroll bar is provided as part of the graphing sub-window 152 to allow the user to view earlier portions of the charts.

Figure 5B:
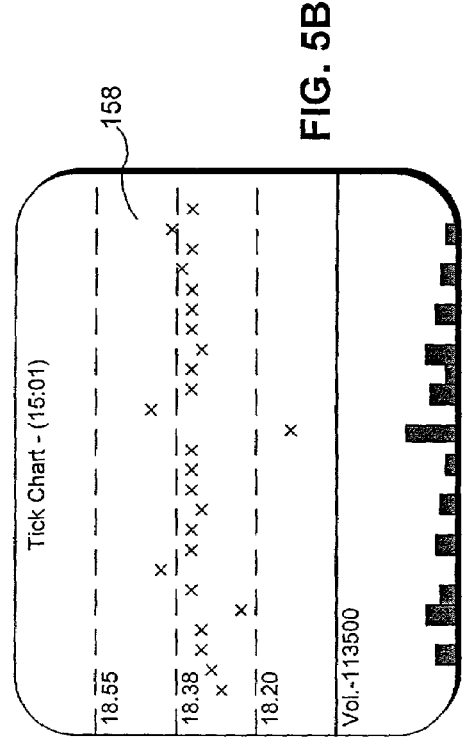
FIG. 5B is a block diagram of zoom chart window.

Occasionally, a user may be interested in one particular item of information displayed on a chart. In the illustrated example, there is a price bar which spikes downward at about time index 15:01. The user may be interested in checking this irregularity. The securities tracking system 10 includes a zoom feature where the user places the mouse cursor 156 over the desired item to be zoomed in on by initiating a mouse 32, keyboard 30 or voice command. Upon initiating the command, a zoom chart 158 (illustrated in FIG. 5B) is displayed on the display screen 50. The zoom chart 158 displays information at the corresponding time index but with greater resolution. More specifically, the securities tracking system 10 will display a chart corresponding to the chart displayed in the graphing sub-window 152 but at a duration which is one choice smaller from the duration selection made in the second menu 154 for the graphing sub-window 152. For example, if the graphing sub-window 152 illustrates a five-minute chart, the zoom chart 158 will display information surrounding the selected five-minute interval by one-minute increments. The user can repeat this process by clicking at a point in the zoom chart 158 to then display a second zoom chart 158 in the form of a tick chart for the selected one-minute interval. In the illustrated embodiment, the chart window illustrated in FIG. 5A shows a one-minute chart and a corresponding zoom chart 158 illustrated in FIG. 5B is a tick chart. By zooming in on a portion of a chart, a user can gain insight as to market behavior. In addition, the user can use the zoom feature to identify erroneous data values which may have been transmitted to the securities tracking system 10. For example, the exemplary downward spiking bar may have been the result of a trade which actually took place at about $18.35 but was erroneously entered at $18.18.

Referring now to FIG. 6, an example alert window 60 is displayed. As indicated above, the alert window contains alerts which are triggered by level 1 data, level 2 data or the statistics derived therefrom. The alerts can be programmed by the user to be triggered on a global basis, on a per-security basis or on a per-market maker basis. More specifically, global alerts are those which are triggered for any security or market maker upon the presence of a certain condition. For example, the user can specify that an alert is triggered if relative bid volume for any security drops below 10%. An example specific alert is if the relative bid volume (ask volume) for Dell Computers (ticker symbol DELL) goes below 15% (above 85%). Alerts can take a number of forms, such as flashing icons on the display screen 50, audio alerts broadcast via the speaker 40 and the addition of the alert to the alert window 60. It is noted that the securities tracking system 10 produces alerts for all items in the user's database and not just the items displayed at any given time on the display screen 50.

The user can select any of the displayed alerts in the alert window 60 by invoking an appropriate keyboard 30, mouse 32 action or voice command. Upon selecting one of the displayed alerts, the level 1 and level 2 information display window 54 will show level 1 and level 2 information for the selected security, and the chart window 58 will show a trade history chart for the selected security. In addition, a pop-up menu will appear offering the user choices for taking action with respect to the alert. The menu choices include clearing the alert (i.e., removing the alert from display so that if the alert threshold is crossed again, the alert will be regenerated), resetting the alert (i.e., entering a new alert threshold), and opening an alert programming menu for configuring how the alerts are generated based on calculated statistics. In one embodiment of the invention, if the user does not select the alert and/or take action based upon one of the menu choices, the alert will clear itself automatically on the occurrence of a programmed event. These programmed events can include the expiration of a timer (for example, the alert will be removed from the alert window if it has been displayed for two minutes without otherwise being acted upon by the user) or when the condition generating the alert no longer persists (for example, if relative bid volume for a security falls below 10% and triggers an alert, the alert will be cleared if the relative bid volume goes back above the 10% threshold or some other programmed alert clearing threshold).

FIG. 6 illustrates some example alerts that can be defined by the user. As one skilled in the art will appreciate, many other types of alerts can be established based on the calculated statistics or based on level 1 information and/or level 2 information. Alerts are displayed in table format. The illustrated exemplary table contains seven items of information. The order of alerts can be sorted by selecting headings displayed across the top of the table. These headings, as with the headings of the other tables presented in the various windows of the display screen 50, can be in "button" format as illustrated in FIG. 6. These exemplary columns include a ticker symbol column, a user defined name for the alert, field column (i.e., the category of level 1, level 2 or calculated statistics which generates the alert), a type column (i.e., an identification of how the alert was triggered with respect to the category identified in the field column), a value column (for identifying the threshold value for triggering the alert), a last value column (for identifying the value that triggered the alert) and a time column (for identifying the time at which the alert was generated).

The first two exemplary alerts illustrated in FIG. 6 are triggered using level 1 information. More specifically, the alerts for JNPR and AAPL were generated based on price (i.e., last trade value), and more particularly the daily high or low, for those particular securities. Respectively, the trade values which triggered those alerts were $33.94 and $21.60. These alerts may be configured by the user to be specific to the particular stocks. For example, if JNPR was trading at about $40.00 per share, the user may have been interested in any significant deviation from that amount. Example alerts that can be configured include the price falling below or rising above specified values (e.g., $36.50 and $45.00 respectively) or a certain percentage deviation in price.

The next four exemplary alerts illustrate alerts generated based on relative volume. For example, an alert was programmed by the user for Dell Computer (ticker symbol DELL) so that if the relative bid volume dropped below 15% the alert would be triggered. The next three alerts for JNPR, ATHM and MSFT exemplify a globally configured alert to be triggered if any security has a relative volume that falls below 10% or rises above 90%.

The next two alerts illustrate triggered alerts based on buy pressure (i.e., upward price pressure) or sell price pressure (i.e., downward price pressure). For example, as shown by the alert for SVIN, the user may have configured an alert to be triggered if any security has a buy pressure of 10 or greater and a sell pressure of 10 or greater. As shown for the alert for ROBS, the user may have configured an alert to be triggered if the buy pressure for ROBS is −8 or less and the sell pressure for ROBS is −6 or less.

As one skilled in the art will appreciate, alerts can be programmed for any data value and can be based on a specific threshold value or deviation (expressed as a number or as a percentage) from a current or specified value. In addition, an alert can be based on multiple parameters. For example, an alert could be configured to detect of a security has a buy/sell pressure of X/Y and a total bid/ask volume of Z shares.

Referring now to FIGS. 7A to 7D, an exemplary architecture, or operational logic 200, for the securities and market maker activity tracking system software tool is illustrated. The illustrated architecture shows operational processing blocks, each one of which may represent a number of sub-processes, routines or applettes. The illustrated architecture is intended to show the functionality and operation of an implementation of the above described logic and system 10. If embodied in software, each functional block may represent a module, segment, or portion of code that contains one or more executable instructions to implement the specified logic function(s). If embodied in hardware, each functional block may represent a circuit or a number of interconnected circuits to implement the specified logical function(s).

Although the architecture blocks are shown in a specific order of execution, it is understood that the order of execution may differ from that depicted. For example, the order of execution of two or more blocks may be altered relative to the order shown. Also, two or more blocks shown in succession may be executed concurrently or with partial concurrence. In addition, various blocks may be omitted. It is understood that all such variations are within the scope of the present invention.

In processing block 202, the operational logic 200 will commence a data feed by establishing a communications link with the level 1 and level 2 data service provider. As indicated above, the data will be received over the external network 38 or alternative communications device, such as the satellite receiver 39, using the appropriate interface, such as the modem 24 or data receiver 25.

In processing block 204, the securities and market maker activity tracking software tool, or program, is launched. More specifically, the software tool is read from the memory 16 or other computer readable medium and executed by the processor 14.

In processing block 205, the operational logic 200 will retrieve program settings. The program settings include items such as level 2 data filtration levels, refresh rates, index rates, index periods, and so forth.

In processing block 206, the program links the user to the database containing user-defined parameters, such as the watch lists populated with securities of interest to the user, user-defined alerts and security information (e.g., level 1 and level 2 information). Should the user not link the program to a database, the operational logic 100 will terminate in processing block 208. If, however, the user links the software tool to a database in processing block 206, the operational logic 200 will proceed to processing block 210 where the operational logic checks for a security code. If the correct security clearance is made, the operational logic 200 will proceed to processing block 212 where the software tool will load the user's database, including the watch lists and associated securities and the alerts to be triggered based on changing market conditions and market maker activity. If a valid security code is not verified in processing block 210 the user will be afforded the opportunity to input valid security clearance in processing block 214. If, in processing block 214, the user does not input valid security clearance information, the software tool will terminate in processing block 208. Otherwise, the operational logic 200 will proceed to processing block 212. It should be understood that access to the software tool can be limited by alternative access control techniques, including passwords, biometric scans, and/or digital signatures.

As one skilled in the art will also recognize, some features and functions are not limited for use with the computer system 12, but can be accessed by a remotely located system over the network 38. More specifically, the computer system 12 can carry out portions of the operational logic 200 described herein and transmit data and/or calculated values to a remote workstation or remote workstations for display, further processing and/or completing other portions of the operational logic 200.

In processing block 216 the software tool will access the data feed that was commenced in processing block 202. The data feed may contain level 1 information, level 2 information, indices information (i.e., the DOW, the NASDAQ composite, the S&P 500, and the like), futures information, options information and currency information. Upon accessing the data feed in processing block 216, the operational logic 200 will begin to monitor the data feed in processing block 218. The processing block 218 will examine the items of information received over the data feed and pass each item of information to an appropriate subprocess. In the illustrated embodiment, three subprocesses are present corresponding to an indices subprocess 220 (FIG. 7B), a level 1 data subprocess 224 (FIG. 7C) and a level 2 data subprocess 238 (FIG. 7D). Other subprocesses can be added for the processing and handling of data feed information relating to futures, options and currencies, but will not be described in detail herein.

Figure 7A:
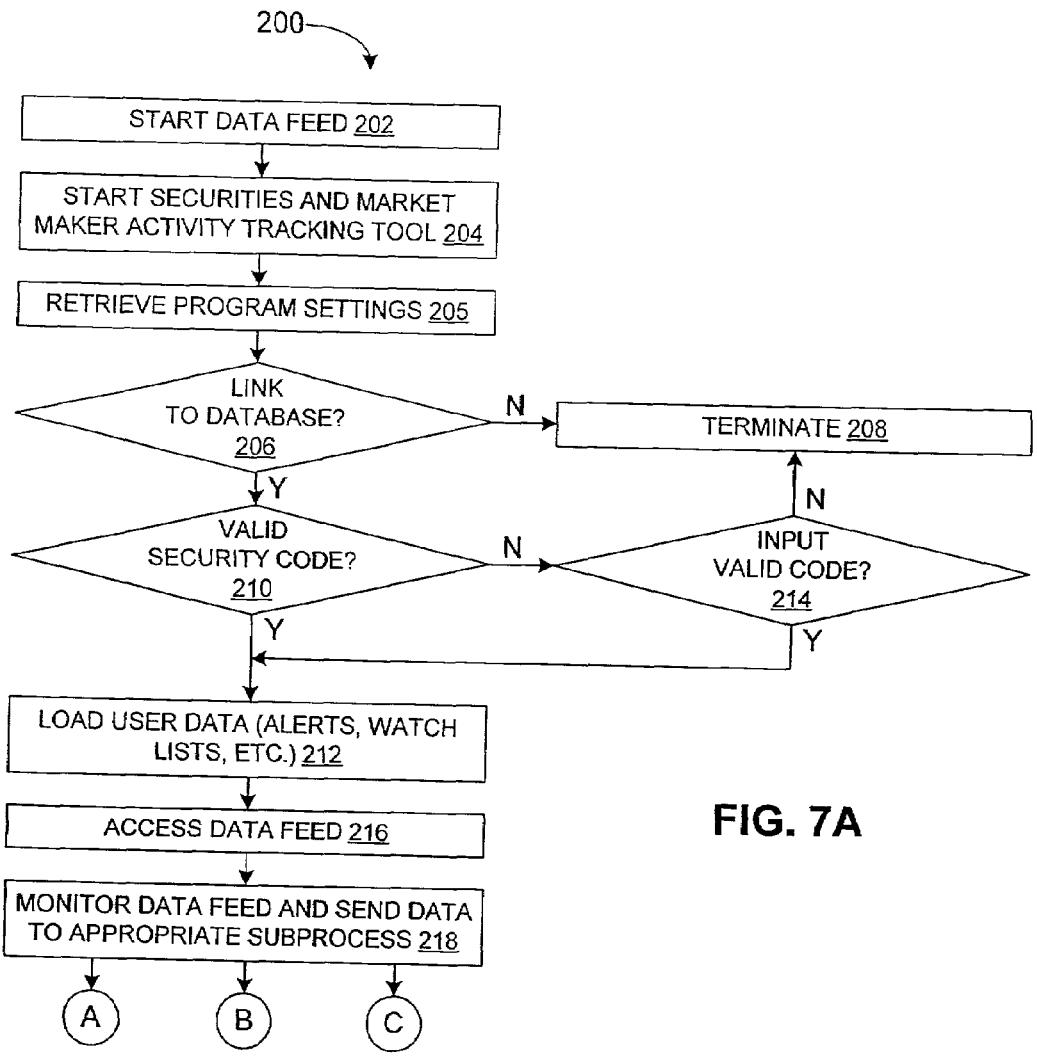
FIGS. 7A to 7D illustrate an exemplary architecture for a securities and market maker activity tracking system software tool according to the present invention.
Figure 7B:
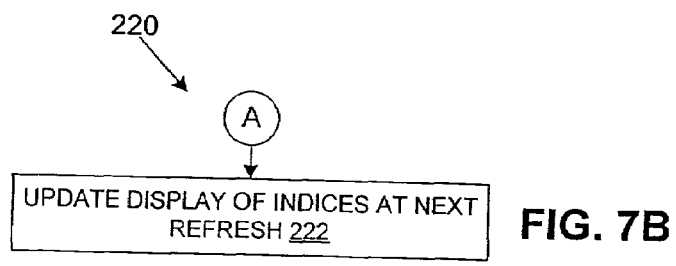

Referring now to FIG. 7B, the indices subprocess 220 is illustrated. Processing block 218 (FIG. 7A) will pass any information related to an index to the indices subprocess 220. Generally, the system 10 does not perform any detailed calculations based on index data. Therefore, in processing block 222, the operational logic 200 will update any display screen 50 information that has changed based on the index information contained within the data stream on or before the next display screen 50 refresh.

Figure 7C:
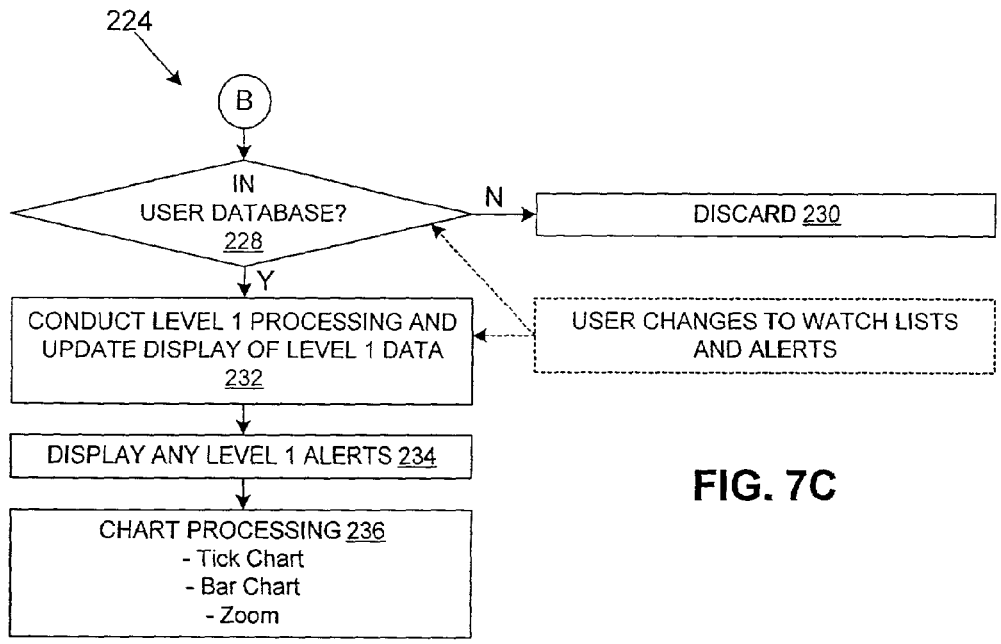
Figure 7D:
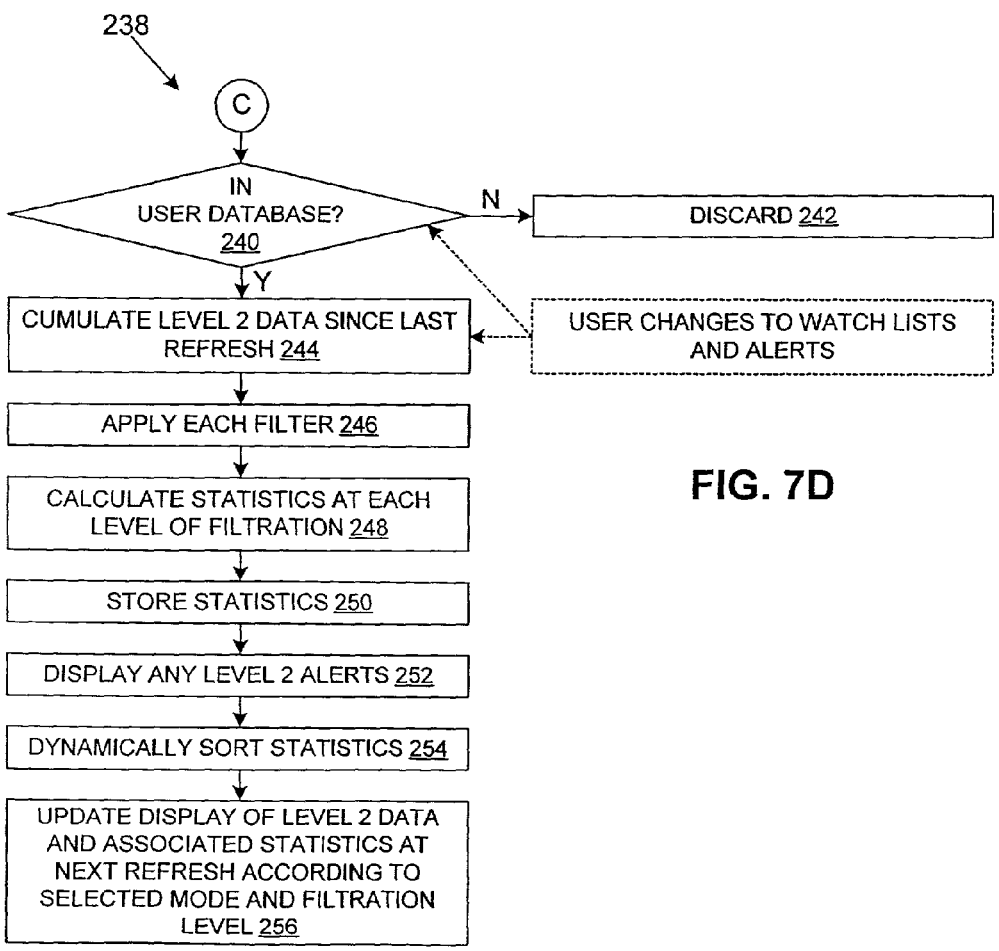

Referring now to FIG. 7C, the level 1 data subprocess 224 is illustrated. As items of information relating to level 1 data are received, processing block 218 (FIG. 7A) will pass these items of level 1 information to the level 1 data subprocess 224. In processing block 228, the level 1 data subprocess 224 will determine if the item of level 1 information corresponds to any security or alert contained within the user's database. It is noted that subsequent to loading the user's data in processing block 212, the user may have updated or otherwise changed one or more securities in one or more of the user's watch lists and/or changed the alert parameters processed by the system 10. Those changes will be considered by processing block 228, and subsequent processing blocks 232 to 236, when determining if the incoming items of level 1 information correspond to items in the user's database. If any item of level 1 information does not correspond to an item in the user's database, that item of level 1 information will be discarded in processing block 230. Otherwise, the items of incoming level 1 information will be passed to processing block 232 where the level 1 subprocess 224 will conduct any appropriate processing of the level 1 data items. In addition, the display screen 50 windows (such as the information display window 54 and the chart window 58) will be updated based on any new or changed level 1 information for the security presently displayed in those windows.

In processing block 234, the level 1 data subprocess 224 will determine if any alerts based on level 1 information (e.g., price of a trade) triggers one of the alerts. If an alert is triggered based on level 1 information, that alert will be displayed in the alert window 60 or otherwise broadcast to the user. The processing block 234 can also be programmed to determine if any triggered alerts should be cleared. As indicated above, alerts can be cleared by appropriate user action, on the expiration of a timer associated with each alert, or if the condition generating the alert is no longer present. If there is an alert or alerts to be cleared, the level 1 data subprocess 224 will clear the alert and remove it from display in processing block 234.

In processing block 236, the operational logic 200 will display a chart in the chart window 58 according to selections made by the user. Those selections include a bar chart of specified duration or a tick chart as is known in the art. The user may elect to zoom in on one aspect of the chart to call up a zoom chart 158 having a duration resolution less than the duration resolution displayed in chart 152 (FIG. 5A). Using the drop down menu 150, the user can also select other types of charting methods as described in greater detail above to display charts of calculated statistics based on the activity of market makers.

Referring now to FIG. 7D, the level 2 data subprocess 238 is illustrated. As items of information relating to level 2 data are received, processing block 218 (FIG. 7A) will pass these items to the level 2 data subprocess 238. In processing block 240, the level 2 data subprocess 238 will determine if each incoming level 2 data value corresponds to an item contained within the user's database, including securities contained within the watch list and alerts. If the incoming level 2 data value does not correspond with an item in the user's database, the level 2 data item will be discarded in processing block 242. Otherwise, the level 2 data item will be passed to processing block 244. It is noted that any changes to the user's database since loading of the information contained within the user's database in processing block 212 (FIG. 7A) will be considered by processing block 240. Those updates will also be considered for each of the processing blocks 244 through 256.

In processing block 244, the level 2 data subprocess 238 will track each item of level 2 information received since the last display screen 50 refresh for use in subsequent calculations as described herein. In processing block 246, the level 2 data subsystem 238 will apply the level 2 filters as described in greater detail above. More specifically, each level 2 filter, as set by default or as set by the user (e.g., 1%, 1.5%, 2%, etc. of the last trade value for each stock), will be applied to the level 2 data to filter out bids and asks a specified percentage away from the corresponding security's last trade price to derive corresponding data sets containing the bids and asks placed by the market makers for each security that have been passed by the filter (i.e., not discarded as being outside the filtration level thresholds).

In processing block 248, the level 2 data subsystem 238 will calculate the statistics for the various modes of operation, including the watch list mode, market maker's book mode, the market stocks mode, the market player's mode, and the insider mode, for each data set resulting from the application of each filter in processing block 248. The statistics calculated in processing block 248 will be stored in processing block 250 for subsequent retrieval and display as a chart in window 58, in the analysis result window 56, and/or in the information display window 54. It is noted that the statistics are stored along with the level 1 data.

In processing block 252, the level 2 data subsystem 238 will determine if any alerts dependent upon level 2 statistics are triggered based on the calculated statistics of processing block 248 and, if any alerts are tripped, processing block 252 will display those alerts in the alert window 60 or otherwise notify the user. The generation of alerts can be limited to alerts triggered based on statistics generated from one of the data sets resulting from the application of a filter in processing block 248. Processing block 252 will also determine if there are any previously triggered alerts to be cleared and if so, clear those alerts. As indicated above, alerts may be cleared by appropriate user action, upon the expiration of a timer associated with each alert, or if the condition generating the alert is no longer present.

In processing block 254, the level 2 data subprocess dynamically sort the statistics along with the statistics' associated ticker symbols and market maker identifiers. As described above in greater detail, the dynamic sorting uses the most recently calculated statistics to arrange the displayed items in an order selected by the user. For example, if the user has selected the watch list display mode and to view the displayed information by total volume, the level 2 data subprocess 238 will arrange the securities in the displayed watch list with the security having the highest combined total of bid volume and ask volume displayed first, the security having the next highest combined total bid and ask volume displayed second, and so forth.

In processing block 256, the level 2 data subsystem 238 will update the display of level 2 data (such as the raw bid and ask data displayed in the information display window 54) and any associated calculated statistics (such as the statistics displayed in the analysis result window 56 and the insider aging window 88) at the next display screen 50 refresh. It is noted that the displayed information is displayed according to the user-selected mode of operation and the selected filtration level for displayed information.

As one skilled in the art will appreciate, the foregoing architecture for the securities and market maker activity tracking software tool and associated operational logic 200 is exemplary. Alternative methods of carrying out the logic and methods described herein will be apparent to one of ordinary skill in the art and is intended to fall within the scopes of the claims appended hereto.

The logic described herein can be embodied in any computer-readable medium for use by or in connection with an instruction execution system such as a computer/processor-based system or other system that can fetch or obtain the logic from the computer-readable medium and execute the instructions contained therein. In the context of this document, a "computer-readable medium" can be any medium that can contain, store or maintain logic and/or data for use by or in connection with the instruction execution system. The computer-readable medium can be any one of many physical media such as, for example, electronic, magnetic, optical, electromagnetic, infrared, or semiconductor media. More specific examples of suitable computer-readable medium would include, but are not limited to, a portable magnetic computer diskette such as a floppy disk, a hard disk, a random access memory (RAM), a read-only memory (ROM), an erasable, programmable read-only memory (EPROM), or a compact disk (e.g., a CD, a CD-RW, or a DVD-ROM).

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and analyzing each data item within the data stream with an automated computer processor configured for executing logic and transforming the market data by:

for each security from the predetermined set of securities, summing the volume of all active market makers' bids from the dynamically updated data stream and associated with the security to establish a total of all active market maker bid volume for the security;

for each security from the predetermined set of securities, summing the volume of all active market makers' asks from the dynamically updated data stream and associated with the security to establish a total of all active market maker ask volume for the security; and for each security, updating all of the total active market maker bid volumes and all of the total active market maker ask volumes to be current relative to the dynamically updated data stream;

wherein the dynamically updated total active market maker bid volume compared to the dynamically updated total active market maker ask volume respectfully for each predetermined security is indicative of a temporary imbalance in market maker activity for the security.

2. The method according to claim 1, wherein the total active market maker bid volume for each predetermined security and the total active market maker ask volume for each predetermined security are converted with the configured processor into relative bid volume and relative ask volume.

3. The method according to claim 2, further comprising the step of displaying on a display device the relative bid volume and relative ask volume.

4. The method according to claim 1, further comprising the step of displaying on a display device the total active market maker bid volume and the total active market maker ask volume for the predetermined set of securities in a table.

5. The method according to claim 4, further comprising the step of dynamically sorting the table with the configured processor based on a parameter selected by the user to reflect current market maker activity.

6. The method according to claim 1, further comprising the steps of, with the configured processor, summing the total number of market makers having an active bid associated with each predetermined security and summing the total number of market makers having an active ask associated with each predetermined security.

7. The method according to claim 6, further comprising the step of displaying on a display device the total number of market makers having an active bid and the total number of market makers having an active ask.

8. The method according to claim 1, wherein before the summing steps, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

9. The method according to claim 8, wherein the step of filtering is conducted for a plurality of selected threshold percentages and for each selected threshold percentage a corresponding data set is derived, the total active market maker bid volume and the total active market maker ask volume being calculated and updated for each predetermined security for each data set.

10. The method according to claim 1, further comprising the step of storing in a memory device the total active market maker bid volume and total active market maker ask volume for each predetermined security, the stored volumes adapted for display as historical market maker activity.

11. The method according to claim 1, wherein each total active market maker bid volume and each total active market maker ask volume are updated with the configured processor on a periodic basis.

12. The method according to claim 1, further comprising the step of generating an alert with the configured processor if the total active market maker bid volume or the total active market maker ask volume for one of the predetermined securities crosses a threshold value.

13. The method according to claim 12, wherein the threshold value is globally established with the configured processor for all predetermined securities from the predetermined set of securities.

14. The method according to claim 12, wherein the threshold value is established for a specific security.

15. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid value and active asks each having an ask value; and analyzing each data item within the data stream with an automated computer processor configured for executing logic and transforming the market data by:

for each security from the predetermined set of securities and for each market maker having an active bid for the security, ascertaining a change in active bid value by determining whether an active bid placed by the market maker has a value higher than, the same as, or lower than a just previous active bid placed by the same market maker;

for each security from the predetermined set of securities and for each market maker having an active ask for the security, ascertaining a change in active ask value by determining whether an active ask placed by the market maker has a value higher than, the same as, or lower than a just previous active ask placed by the same market maker; and updating each change in active bid value and each change in active ask value to be current relative to the dynamically updated data stream;

wherein, for each predetermined security, the change in active bid value for each market maker compared to the change in active ask value for the market maker is indicative of a temporary imbalance in market maker activity for the security.

16. The method according to claim 15 further comprising, for each predetermined security, deriving with the configured processor buy pressure by counting the active bids that have increased in price and reducing the number of bids that have increased in price by the number of active bids that have decreased in price and deriving sell pressure by counting the active asks that have increased in price and reducing the number of asks that have increased in price by the number of active asks that have decreased in price.

17. The method according to claim 16 further comprising, for each buy pressure and with the configured processor, converting the buy pressure to a relative buy pressure by dividing the buy pressure by the number of market makers having active bids for the security and, for each sell pressure, converting the sell pressure to a relative sell pressure by dividing the sell pressure by the number of market makers having active asks for the security.

18. The method according to claim 16 further comprising, for each predetermined security, deriving with the configured processor pressurized bid volume by summing the bid volume for each active bid that has increased in price and subtracting the bid volume for each active bid that has decreased in price, and deriving with the configured processor pressurized ask volume by summing the ask volume for each active ask that has increased in price and subtracting the ask volume for each active ask that has decreased in price.

19. The method according to claim 16 further comprising, with the configured processor, summing the volume of each active bid associated with each predetermined security and summing the volume of each active ask associated with each predetermined security.

20. The method according to claim 16, further comprising the step of displaying on a display device the buy pressure and the sell pressure for the predetermined securities in a table.

21. The method according to claim 20, further comprising the step of dynamically sorting the table with the configured processor based on a parameter selected by the user to reflect current market maker activity.

22. The method according to claim 15 further comprising, with the configured processor, summing the volume of each active bid associated with each predetermined security and summing the volume of each active ask associated with each predetermined security.

23. The method according to claim 22, wherein the total bid volume for each predetermined security and the total ask volume for each predetermined security are converted with the configured processor into relative bid volume and relative ask volume.

24. The method according to claim 15, further comprising the steps, with the configured processor, of summing the total number of market makers having an active bid associated with each predetermined security and summing the total number of market makers having an active ask associated with each predetermined security.

25. The method according to claim 15, wherein before the ascertaining steps, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

26. The method according to claim 25, wherein the step of filtering is conducted for a plurality of selected threshold percentages and for each selected threshold percentage a corresponding data set is derived, the change in active bid value and the change in active ask value being calculated and updated for each predetermined security for each data set.

27. The method according to claim 15, further comprising the step of storing in a memory device the change in active bid value and the change in active ask value derived for each predetermined security, the stored values adapted for display as historical market maker activity.

28. The method according to claim 15, wherein each change in active bid value and each change in active ask value are updated with the configured processor on a periodic basis.

29. The method according to claim 15, further comprising the step of generating an alert with the configured processor if the change in active bid value or the change in active ask value for one of the predetermined securities crosses a threshold value.

30. The method according to claim 27, wherein the threshold value is globally established with the configured processor for all predetermined securities from the predetermined set of securities.

31. The method according to claim 29, wherein the threshold value is established for a specific security.

32. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and analyzing each data item within the data stream with an automated computer processor configured for executing logic and transforming the market data by:

selecting a market maker from the plurality of market makers;

for the selected market maker, identifying each security from the predetermined set of securities for which the selected market maker has at least one of an active bid or an active ask;

for each of the identified securities, determining the selected market maker's bid volume and determining the selected market maker's ask volume; and for each of the identified securities, updating both the selected market maker's bid volume and ask volume to be current relative to the dynamically updated data stream wherein the selected market maker's dynamically updated bid volume as compared to the selected market maker's dynamically updated ask volume for each identified security is indicative of a temporary imbalance in market maker activity for the security.

33. The method according to claim 32, wherein the market maker's bid volume and ask volume are converted with the configured processor into relative bid volume and relative ask volume.

34. The method according to claim 32, further comprising the step of displaying on a display device a list of identified securities and an indication of the selected market maker's bid volume and ask volume for the identified securities in a table.

35. The method according to claim 34, further comprising the step of dynamically sorting the table with the configured processor based on a parameter selected by the user to reflect current market maker activity.

36. The method according to claim 32, wherein before the identifying step, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

37. The method according to claim 26, wherein the step of filtering is conducted for a plurality of selected threshold percentages and for each selected threshold percentage a corresponding data set is derived, the selected market maker's bid volume and ask volume being calculated and updated for each predetermined security for each data set.

38. The method according to claim 32, further comprising the step of storing in a memory device the selected market maker's bid volume and selected market maker's ask volume, the stored volumes adapted for display as historical market maker activity.

39. The method according to claim 32, wherein the selected market maker's bid volume and selected market maker ask volume are updated with the configured processor on a periodic basis.

40. The method according to claim 32, further comprising the step of generating an alert with the configured processor if the selected market maker bid volume or the selected market maker ask volume for the selected market maker crosses a threshold value.

41. The method according to claim 40, wherein the threshold value is globally established with the configured processor for all market makers.

42. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and analyzing each data item within the data stream with an automated computer processor configured for executing logic and transforming the market data by:

for each security from the predetermined set of securities, and for each market maker on a market maker by market maker basis, determining a combined bid volume from all of the market maker's bids for the security;

for each security from the predetermined set of securities, and for each market maker on a market maker by market maker basis, determining a combined ask volume from all of the market maker's asks for the security; and for each market maker, updating each combined bid volume and each combined ask volume to be current relative to the dynamically updated data stream;

wherein, for each security from the predetermined set of securities, the updated combined bid volume of each market maker relative to the updated combined ask volume for the market maker is indicative of a temporary imbalance in market maker activity for the security.

43. The method according to claim 42, wherein the combined bid volume and the combined ask volume are converted with the configured processor into relative bid volume and relative ask volume.

44. The method according to claim 42, further comprising the step of displaying on a display device the securities and market makers by highest combined bid volume and ask volume in a table.

45. The method according to claim 44, further comprising the step of dynamically sorting the table with the configured processor based on a parameter selected by the user to reflect current market maker activity.

46. The method according to claim 42, wherein before the determining steps, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

47. The method according to claim 46, wherein the step of filtering is conducted for a plurality of selected threshold percentages and for each selected threshold percentage a corresponding data set is derived, the combined bid volume and the combined ask volume being calculated and updated for each predetermined security for each data set.

48. The method according to claim 42, further comprising the step of storing in a memory device the combined bid volume and the combined ask volume for each predetermined security, the stored combined volumes adapted for display as historical market maker activity.

49. The method according to claim 42, wherein the combined bid volume and the combined ask volume are updated with the configured processor on a periodic basis.

50. The method according to claim 42, further comprising the step of generating an alert with the configured processor if the combined bid volume or the combined ask volume for one of the predetermined securities crosses a threshold value.

51. The method according to claim 50, wherein the threshold value is globally established with the configured processor for all predetermined securities from the predetermined set of securities.

52. The method according to claim 50, wherein the threshold value is established for a specific security.

53. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and analyzing each data item within the data stream with an automated computer processor configured for executing logic and transforming the market data by:

for each market maker, summing the volume of each active bid associated with all of the predetermined securities to establish a total bid volume for the market maker;

for each market maker, summing the volume of each active ask associated with all of the predetermined securities to establish a total ask volume for the market maker; and updating the total bid volume for each market maker and total ask volume for each market maker to be current relative to the dynamically updated data stream;

wherein the updated total volume of active bids for each market maker as compared to the updated total volume of active asks for the market maker is indicative of a temporary imbalance in market maker activity.

54. The method according to claim 53, wherein the total bid volume and the total ask volume are converted with the configured processor into relative bid volume and relative ask volume.

55. The method according to claim 53 further comprising:

determining with the configured processor whether a bid placed by any of the market makers has a value higher than, the same as or lower than the previous bid placed by the same market maker for the same security, and determining whether an ask placed by any of the market makers has a value higher than, the same as or lower than the previous ask placed by the same market maker for the same security; and for each market maker, deriving market maker buy pressure with the configured processor by counting the active bids for the market maker for the selected set of securities that have increased in price and reducing the number of bids that have increased in price by the number of active bids for the market maker for the selected set of securities that have decreased in price and deriving market maker sell pressure with the configured processor by counting the active asks for the market maker for the selected set of securities that have increased in price and reducing the number of asks that have increased in price by the number of active asks for the market maker for the selected set of securities that have decreased in price.

56. The method according to claim 53, further comprising the step of displaying on a display device an indication of the total bid volume and an indication of the total ask volume for each market maker in a table.

57. The method according to claim 56, further comprising the step of dynamically sorting the table with the configured processor based on a parameter selected by the user to reflect current market maker activity.

58. The method according to claim 53, wherein before the summing steps, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

59. The method according to claim 58, wherein the step of filtering is conducted for a plurality of selected threshold percentages and for each selected threshold percentage a corresponding data set is derived, the total bid volume for each market maker and the total ask volume for each market maker being calculated and updated for each predetermined security for each data set.

60. The method according to claim 53, further comprising the step of storing in a memory device the total bid volume and the total ask volume for each market maker, the stored total volumes adapted for display as historical market maker activity.

61. The method according to claim 53, wherein each total bid volume for each market maker and each total ask volume for each market maker are updated with the configured processor on a periodic basis.

62. The method according to claim 53, further comprising the step of generating an alert with the configured processor if the total bid volume for each market maker or the total ask volume for each market maker for one of the selected market makers crosses a threshold value.

63. The method according to claim 62, wherein the threshold value is globally established with the configured processor for all market makers.

64. The method according to claim 62, wherein the threshold value is established for a specific market maker.

65. A method of tracking activity of a plurality of market makers where the market makers place bids and asks relating to securities traded on at least one common exchange, the method comprising the steps of:
receiving with an electronic receiver a dynamically updated data stream of market data containing level 1 data and level 2 data relating to at least a predetermined set of securities traded over the at least one common exchange,
wherein the received level 1 data contains inside asks and inside bids associated with the predetermined securities, and the level 2 data contains, for market makers associated with the predetermined securities, active bids and active asks associated with the predetermined securities; and
analyzing each data item within the data stream with an automated computer processor configured for executing logic and transforming the market data by:
for each security from the predetermined set of securities over a specified time period, determining a bid persistence indicator for each market maker by calculating the portion of the specified time period that the market maker has had one or more bids equal to or higher than the level 1 inside bid for the security;
for each security from the predetermined set of securities over a specified time period, determining an ask persistence indicator for each market maker by calculating the portion of the specified time period that the market maker has had one or more asks equal to or lower than the level 1 inside ask for the security; and
updating each bid persistence indicator and each ask persistence indicator to be current relative to the dynamically updated data stream;
wherein, for each predetermined security, the bid persistence indicator for each market maker and ask persistence indicator for each market maker is indicative of a temporary imbalance in market maker activity for the security.

66. The method according to claim 65, wherein the bid persistence indicator and the ask persistence indicator are respectively calculated with the configured processor by determining the percentage of the time period for which the market maker has had one or more bids equal to or higher than a level 1 bid for the corresponding security and determining the percentage of the time period for which the market maker has had one or more asks being equal to or lower than a level 1 ask for the corresponding security.

67. The method according to claim 65, wherein the bid persistence indicator and an ask persistence indicator for each market maker are respectively calculated with the configured processor by:
dividing the specified time period into a plurality of segments;
for each segment and for each predetermined security, assigning the market maker a bid value and an ask value of one or zero, a bid value of one being assigned when the market maker has a bid being equal to or higher than a level 1 bid for the security, otherwise a bid value of zero is assigned and an ask value of one being assigned when the market has an ask being equal to or lower than a level 1 ask for the security, otherwise an ask value of zero is assigned; and
solving the equation:

$$100\left(\sum VAL_P + \frac{CV - \sum VAL_P}{m}\right)$$

for both bid values and ask values, wherein $\Sigma VAL_P$ is the sum of all values calculated by the equation one segment earlier, m is the number of segments in the time period and CV is the respective current bid value and current ask value assigned to the market maker for the security.

68. The method according to claim 65, further comprising the step of displaying on a display device the bid and ask persistence indicators in a table.

69. The method according to claim 68, further comprising the step of dynamically sorting the table with the configured processor based on a parameter selected by the user to reflect current market maker activity.

70. The method according to claim 65, wherein before the determining steps, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

71. The method according to claim 70, wherein the step of filtering is conducted for a plurality of selected threshold percentages and for each selected threshold percentage a corresponding data set is derived, the bid persistence indicator and the ask persistence indicator being calculated and updated for each predetermined security for each data set.

72. The method according to claim 65, further comprising the step of filtering with the configured processor securities from the predetermined set of securities that have a trade volume below a volume threshold.

73. The method according to claim 65, further comprising the step of storing in a memory device the bid persistence indicator and the ask persistence indicator derived for each predetermined security, the stored indicators adapted for display as historical market activity.

74. The method according to claim 65, wherein each bid persistence indicator and each ask persistence indicator are updated with the configured processor on a periodic basis.

75. The method according to claim 65 further comprising the step of generating an alert with the configured processor if the bid persistence indicator or the ask persistence indicator for one of the predetermined securities crosses a threshold value.

76. The method according to claim 75, wherein the threshold value is globally established with the configured processor for all selected securities within the predetermined set of securities.

77. The method according to claim 75, wherein the threshold value is established for a specific security.

78. A method of tracking activity of a plurality of market makers where the market makers place bids and asks relating to securities traded on at least one common exchange, the method comprising the steps of:
receiving with an electronic receiver a dynamically updated data stream of market data containing level 1 data and level 2 data relating to at least a predetermined set of securities traded over the at least one common exchange,
wherein the received level 1 data contains a last trade value associated with each of the predetermined securities, and the received level 2 data contains, for market makers associated with each of the predetermined securities, active bids each having a bid price and active asks each having an ask price; and
analyzing each data item within the data stream with an automated computer processor configured for executing logic and transforming the market data by, for each of the predetermined securities, dynamically filtering the data stream by discarding active bids having a bid price lower than a last trade value minus a selected threshold percentage of the last trade value, and discarding active asks having an ask price higher than the last trade value plus the selected threshold percentage of the last trade value.

79. The method according to claim 78, wherein the filtering step includes discarding bids having a price higher than the last trade value plus the selected threshold percentage of the last trade value and discarding asks having a price lower than the last trade value minus the selected threshold percentage of the last trade value.

80. The method according to claim 78, wherein the filtering step is conducted for a plurality of selected threshold percentages and for each selected threshold percentage a corresponding data set is derived.

81. The method according to claim 80, further comprising the step of, for each data set for a selected set of securities from the plurality of securities, deriving with the configured processor one or more indicators of a temporary imbalance in market maker activity, the indicator being calculated and updated for each selected security for each data set.

82. The method according to claim 78, further comprising the step of, for the filtered data stream for a selected set of securities from the plurality of securities, deriving with the configured processor one or more indicators of a temporary imbalance in market maker activity.

83. The method according to claim 78, further comprising the step of crossed market filtering the data stream with the configured processor to exclude bids that are higher than a level 1 bid for an associated security and asks that are lower than a level 1 ask for an associated security.

84. A method of tracking activity of a plurality of market makers where the market makers place bids and asks relating to securities traded on at least one common exchange, the method comprising the steps of:
receiving with an electronic receiver a dynamically updated data stream of market data relating to at least a predetermined set of securities traded over the at least one common exchange;
for each security from the predetermined set of securities, analyzing each data item within the data stream with an automated computer processor configured for executing logic and transforming the market data by deriving a set of indicators from the market data indicative of a temporary imbalance in market maker activity for the security;
updating with the configured processor the set of indicators to be current relative to the dynamically updated data stream;
displaying on a display device the set of indicators; and
dynamically sorting the displayed set of indicators with the configured processor so that the set of indicators are displayed in a relative order based on a parameter selected by a user as the set of indicators are dynamically updated to be current with market maker activity.

85. The method according to claim 84, further including the step of turning the dynamic sorting off with the configured processor so that a relative display order stays constant but the indicator for each predetermined security is updated.

86. The method according to claim 84, wherein before the deriving step, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

87. The method according to claim 86, wherein the step of filtering is conducted for a plurality of selected threshold percentages and for each selected threshold percentage a corresponding data set is derived, the indicators being calculated and updated for each predetermined security for each data set.

88. The method according to claim 84, wherein the indicators are updated with the configured processor on a periodic basis.

89. The method according to claim 88, wherein the indicators are displayed on a display device on a periodic basis.

90. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange;

for each security from the predetermined set of securities, analyzing each data item within the data stream with an automated processor configured for executing logic and transforming the market data by deriving a set of indicators from the level 2 data indicative of a temporary imbalance in market maker activity for the security;

updating with the configured processor the set of indicators to be current relative to the dynamically updated data stream; and charting on a display device one or more of the indicators from the set of indicators over a period of time for one of the predetermined securities.

91. A method of tracking activity of a plurality of market makers where the market makers place bids and asks relating to securities traded on at least one common exchange, the method comprising the steps of:

receiving with an electronic receiver a dynamically updated data stream of market data containing level 2 data relating to at least a predetermined set of securities traded over the at least one common exchange, the received level 2 data containing, for market makers associated with each of the predetermined securities, active bids each having a bid volume and bid price, and active asks each having an ask volume and ask price;

analyzing each data item within the data stream with an automated computer processor configured for executing logic and transforming the market data by:

grouping the active bids by price to generate a series of bid price groups, each bid price group but one containing bids of the same price for the bid price group, the remaining bid price group containing all bids having a price more than a specified number of price changes away from an inside bid price;

summing with the configured processor the volume of market maker bids in each bid price group and summing the number of market makers having active bids in each bid price group;

displaying on a display device the total volume for each bid price group and the total number of bids in each bid price group;

grouping with the configured processor the active asks by price to generate a series of ask price groups, each ask price group but one containing asks of the same price for the ask price group, the remaining ask price groups containing all asks having a price more than a specified number of price changes away from an inside ask price;

summing with the configured processor the volume of market maker asks in each ask price group and summing the number of market makers having active asks in each ask price group;

displaying on the display device the total volume for each ask price group and the total number of asks in each ask price group;

updating with the configured processor the bid price groups and ask price groups to be current with the dynamically updated data stream;

wherein the total volume for each bid price group and the total number of bids in each bid price group as compared to the total volume for each ask price group and the total number of asks in each ask price group are indicative of a temporary imbalance in market maker activity for the security.

92. The method according to claim 91, wherein before the grouping step, the method further comprises the step of filtering the data stream with the configured processor, the step of filtering including for each predetermined security, discarding bids having a price lower than the last trade value minus a selected threshold percentage of the last trade value and discarding asks having a price higher than the last trade value plus a selected threshold percentage of the last trade value.

93. The method according to claim 92, wherein the step of filtering is conducted for a plurality of selected threshold percentages and for each selected threshold percentage a corresponding data set is derived, the total volume for each bid price group and the total volume for each ask price group being calculated and updated for each predetermined security for each data set.

94. A system for tracking activity of a plurality of market makers where the market makers place bids and asks relating to securities traded on at least one common exchange, the system comprising:

an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and a processor configured for executing logic to:

for each security from the predetermined set of securities, sum the volume of all active market makers' bids from the dynamically updated data stream and associated with the security to establish a total of all active market maker bid volume for the security;

for each security from the predetermined set of securities, sum the volume of all active market makers' asks from the dynamically updated data stream and associated with the security to establish a total of all active market maker ask volume for the security; and for each predetermined security, update all of the total active market maker bid volumes and all of the total active market maker ask volumes to be current relative to the dynamically updated data stream;

wherein the dynamically updated total active market maker bid volume compared to the dynamically updated total active market maker ask volume respectfully for each security is indicative of a temporary imbalance in market maker activity for the security.

95. The system according to claim 94, wherein the total active market maker bid volume for each predetermined security and the total active market maker ask volume for each predetermined security are converted with the configured processor into relative bid volume and relative ask volume.

96. The system according to claim 95, further comprising a display device for displaying the relative bid volume and relative ask volume.

97. The system according to claim 94, further comprising a display device for displaying the total active market maker bid volume and the total active market maker ask volume for the predetermined set of securities in a table.

98. The system according to claim 97, wherein the processor is configured for executing the logic to dynamically sort the table based on a parameter selected by the user to reflect current market maker activity.

99. The system according to claim 94, wherein the processor is configured for executing the logic to sum the total number of market makers having an active bid associated with each predetermined security and to sum the total number of market makers having an active ask associated with each predetermined security.

100. The system according to claim 99, further comprising a display device for displaying the total number of market makers having an active bid and the total number of market makers having an active ask.

101. The system according to claim 94, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

102. The system according to claim 101, wherein the filter logic is conducted for a plurality of selected threshold percentages and for each selected threshold a corresponding data set is derived, the total active market maker bid volume and the total market maker ask volume being calculated and updated for each predetermined security for each data set.

103. The system according to claim 94, further comprising a memory device for storing the total active market maker bid volume and total market maker ask volume for each predetermined security, the stored volumes adapted for display as historical market maker activity.

104. The system according to claim 94, wherein the processor is configured for executing the logic to update each total active market maker bid volume and each total market maker ask volume on a periodic basis.

105. The system according to claim 94, wherein the processor is configured for executing the logic to generate an alert if the total active market maker bid volume or the total market maker ask volume for one of the predetermined securities crosses a threshold value.

106. The system according to claim 105, wherein the threshold value is globally established for all predetermined securities from the predetermined set of securities.

107. The system according to claim 105, wherein the threshold value is established for a specific security.

108. A system for tracking activity of a plurality of market makers where the market makers place bids and asks relating to securities traded on at least one common exchange, the system comprising:
  an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid value and active asks each having an ask value; and
  a processor configured for executing logic to:
    for each security from the predetermined set of securities and for each market maker having an active bid for the security, ascertain a change in active bid value by determining whether an active bid placed by the market maker has a value higher than, the same as, or lower than a just previous active bid placed by the same market maker;
    for each security from the predetermined set of securities and for each market maker having an active ask for the security, ascertain a change in active ask value by determining whether an active ask placed by the market maker has a value higher than, the same as, or lower than a just previous active ask placed by the same market maker; and
    update each change in active bid value and each change in active ask value to be current relative to the dynamically updated data stream;
  wherein, for each predetermined security, the change in active bid value for each market maker compared to the change in active ask value for the market maker is indicative of a temporary imbalance in market maker activity for the security.

109. The system according to claim 108, wherein the processor is configured for executing the logic for each predetermined security to derive buy pressure by counting the active bids that have increased in price and reducing the number of bids that have increased in price by the number of active bids that have decreased in price and to derive sell pressure by counting the active asks that have increased in price and reducing the number of asks that have increased in price by the number of active asks that have decreased in price.

110. The system according to claim 109, wherein the processor is configured for executing the logic for each predetermined security to convert the buy pressure to a relative buy pressure by dividing the buy pressure by the number of market makers having active bids for the security and to convert the sell pressure to a relative sell pressure by dividing the sell pressure by the number of market makers having active asks for the security.

111. The system according to claim 109, wherein the processor is configured for executing the logic for each predetermined security to derive pressurized bid volume by summing the bid volume for each active bid that has increased in price and subtracting the bid volume for each active bid that has decreased in price, and to derive pressurized ask volume by summing the ask volume for each active ask that has increased in price and subtracting the ask volume for each active ask that has decreased in price.

112. The system according to claim 109, wherein the processor is configured for executing the logic to sum the volume of each active bid associated with each predetermined security and to sum the volume of each active ask associated with each predetermined security.

113. The system according to claim 109, further comprising a display device for displaying the buy pressure and the sell pressure for the predetermined securities in a table.

114. The system according to claim 113, wherein the processor is configured for executing the logic to dynamically sort the table based on a parameter selected by the user to reflect current market maker activity.

115. The system according to claim 108, wherein the processor is configured for executing the logic to sum the volume of each active bid associated with each predetermined security and to sum the volume of each active ask associated with each predetermined security.

116. The system according to claim 115, wherein the processor is configured for executing the logic to convert the total bid volume for each predetermined security and the total ask volume for each predetermined security into relative bid volume and relative ask volume.

117. The system according to claim 108, wherein the processor is configured for executing the logic to sum the total number of market makers having an active bid associated with each predetermined security and to sum the total number of market makers having an active ask associated with each predetermined security.

118. The system according to claim 108, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

119. The system according to claim 118, wherein the filter logic is conducted for a plurality of selected threshold percentages and for each selected threshold a corresponding data set is derived, the change in active bid value and the change in active ask value being calculated and updated for each predetermined security for each data set.

120. The system according to claim 108, further comprising a memory device for storing the change in active bid value and change in active ask value for each predetermined security, the stored changes in value adapted for display as historical market maker activity.

121. The system according to claim 108, wherein the processor is configured for executing the logic to update each change in active bid value and each change in active ask value on a periodic basis.

122. The system according to claim 108, wherein the processor is configured for executing the logic to generate an alert if the change in active bid value or change in active ask value for one of the predetermined securities crosses a threshold value.

123. The system according to claim 122, wherein the threshold value is globally established for all predetermined securities from the predetermined set of securities.

124. The system according to claim 123, wherein the threshold value is established for a specific security.

125. A system for tracking activity of a plurality of market makers where the market makers place bids and asks relating to securities traded on at least one common exchange, the system comprising:
an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and
a processor configured for executing logic to:
select a market maker from the plurality of market makers;
for the selected market maker, identify each security from the predetermined set of securities for which the selected market maker has at least one of an active bid or an active ask;
for each of the identified securities, determine the selected market maker's bid volume and determine the selected market maker's ask volume; and
for each of the identified securities, update both the selected market maker's bid volume and ask volume to be current relative to the dynamically updated data stream;
wherein the selected market maker's dynamically updated bid volume as compared to the selected market maker's dynamically updated ask volume for each identified security is indicative of a temporary imbalance in market maker activity for the security.

126. The system according to claim 125, wherein the processor is configured for executing the logic to convert the market maker's bid volume and ask volume into a relative bid volume and relative ask volume.

127. The system according to claim 125, further comprising a display device for displaying a list of identified securities and an indication of the selected market maker's bid volume and ask volume for the identified securities in a table.

128. The system according to claim 127, wherein the processor is configured for executing the logic to dynamically sort the table based on a parameter selected by the user to reflect current market maker activity.

129. The system according to claim 125, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

130. The system according to claim 129, wherein the filter logic is conducted for a plurality of selected threshold percentages and for each selected threshold a corresponding data set is derived, the selected market maker bid's volume and selected market maker's ask volume being calculated and updated for each predetermined security for each data set.

131. The system according to claim 125, further comprising a memory device for storing the selected market maker's bid volume and selected market maker's ask volume, the stored volumes adapted for display as historical market maker activity.

132. The system according to claim 125, wherein the processor is configured for executing the logic to update the selected market maker's bid volume and the selected market maker's ask volume on a periodic basis.

133. The system according to claim 125, wherein the processor is configured for executing the logic to generate an alert if the selected market maker bid volume and the selected market maker ask volume for the selected market maker crosses a threshold value.

134. The system according to claim 133, wherein the threshold value is globally established for all market makers.

135. A system for tracking activity of a plurality of market makers where the market makers place bids and asks relating to securities traded on at least one common exchange, the system comprising:
an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and
a processor configured for executing logic to:
for each security from the predetermined set of securities, and for each market maker on a market maker by market maker basis, determine a combined bid volume from all of the market maker's bids for the security;
for each security from the predetermined set of securities, and for each market maker on a market maker by market maker basis, determine a combined ask volume from all of the market maker's asks for the security; and
for each market maker, update each combined bid volume and each combined ask volume to be current relative to the dynamically updated data stream;
wherein, for each security from the predetermined set of securities, the updated combined bid volume of each market maker relative to the updated combined ask volume for the market maker is indicative of a temporary imbalance in market maker activity for the security.

136. The system according to claim 135, wherein the processor is configured for executing the logic to convert the combined bid volume and the combined ask volume into relative bid volume and relative ask volume.

137. The system according to claim 135, further comprising a display device for displaying the securities and market makers by highest combined bid volume and ask volume in a table.

138. The system according to claim 137, wherein the processor is configured for executing the logic to dynamically sort the table based on a parameter selected by the user to reflect current market maker activity.

139. The system according to claim 135, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

140. The system according to claim 139, wherein the filter logic is conducted for a plurality of selected threshold percentages and for each selected threshold a corresponding data set is derived, the combined bid volume and the combined ask volume being calculated and updated for each predetermined security for each data set.

141. The system according to claim 135, further comprising a memory device for storing the combined bid volume and the combined ask volume for each predetermined security, the stored combined volumes adapted for display as historical market maker activity.

142. The system according to claim 135, wherein the processor is configured for executing the logic to update the combined bid volume and the combined ask volume on a periodic basis.

143. The system according to claim 135, wherein the processor is configured for executing the logic to generate an alert if the combined bid volume or the combined ask volume for one of the predetermined securities crosses a threshold value.

144. The system according to claim 143, wherein the threshold value is globally established for all predetermined securities from the predetermined set of securities.

145. The system according to claim 143, wherein the threshold value is established for a specific security.

146. A system for tracking activity of a plurality of market makers where the market makers place bids and asks relating to securities traded on at least one common exchange, the system comprising:
  an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid volume and active asks each having an ask volume; and
  a processor configured for executing logic to:
    for each market maker, sum the volume of each active bid associated with all of the predetermined securities to establish a total bid volume for the market maker;
    for each market maker, sum the volume of each active ask associated with all of the predetermined securities to establish a total ask volume for the market maker; and
    update the total bid volume for each market maker and total ask volume for each market maker to be current relative to the dynamically updated data stream;
  wherein the updated total volume of active bids for each market maker as compared to the updated total volume of active asks for the market maker is indicative of a temporary imbalance in market maker activity.

147. The system according to claim 146, wherein the processor is configured for executing the logic to convert the total bid volume and the total ask volume into relative bid volume and relative ask volume.

148. The system according to claim 146, wherein the processor is configured for executing the logic:
  to determine whether a bid placed by any of the market makers has a value higher than, the same as or lower than the previous bid placed by the same market maker for the same security, and determines whether an ask placed by any of the market makers has a value higher than, the same as or lower than the previous ask placed by the same market maker for the same security; and
  for each market maker, to derive market maker buy pressure by counting the active bids for the market maker for the selected set of securities that have increased in price and reducing the number of bids that have increased in price by the number of active bids for the market maker for the selected set of securities that have decreased in price and to derive market maker sell pressure by counting the active asks for the market maker for the selected set of securities that have increased in price and reducing the number of asks that have increased in price by the number of active asks for the market maker for the selected set of securities that have decreased in price.

149. The system according to claim 146, further comprising a display device for displaying an indication of the total bid volume and an indication of the total ask volume for each market maker in a table.

150. The system according to claim 149, wherein the processor is configured for executing the logic to dynamically sort the table based on a parameter selected by the user to reflect current market maker activity.

151. The system according to claim 146, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

152. The system according to claim 151, wherein the filter logic is conducted for a plurality of selected threshold percentages and for each selected threshold a corresponding data set is derived, the total bid volume for each market maker and the total ask volume for each market maker being calculated and updated for each predetermined security for each data set.

153. The system according to claim 146, further comprising a memory device for storing the total bid volume and the total ask volume for each market maker, the stored total volumes adapted for display as historical market maker activity.

154. The system according to claim 146, wherein the processor is configured for executing the logic to update on a periodic basis each total bid volume for each market maker and each total ask volume for each market maker 155. The system according to claim 146, wherein the processor is configured for executing the logic to generate an alert if the total bid volume for each market maker and the total ask volume for each market maker for one of the selected market makers crosses a threshold value.

156. The system according to claim 155, wherein the threshold value is globally established for all market makers.

157. The system according to claim 155, wherein the threshold value is established for a specific market maker.

158. A system for tracking activity of a plurality of market makers where the market makers place bids and asks relating to securities traded on at least one common exchange, the system comprising:

an electronic receiver for receiving a dynamically updated data stream of market data containing level 1 data and level 2 data relating to at least a predetermined set of securities traded over the at least one common exchange, wherein the received level 1 data contains inside asks and inside bids associated with the predetermined securities, and the level 2 data contains, for market makers associated with the predetermined securities, active bids and active asks associated with the predetermined securities; and a processor configured for executing logic to:

for each security from the predetermined set of securities over a specified time period, determine a bid persistence indicator for each market maker by calculating the portion of the specified time period that the market maker has had one or more bids equal to or higher than the level 1 inside bid for the security;

for each security from the predetermined set of securities over a specified time period, determine an ask persistence indicator for each market maker by calculating the portion of the specified time period that the market maker has had one or more asks equal to or lower than the level 1 inside ask for the security; and update each bid persistence indicator and each ask persistence indicator to be current relative to the dynamically updated data stream;

wherein, for each predetermined security, the bid persistence indicator for each market maker and ask persistence indicator for each market maker is indicative of a temporary imbalance in market maker activity for the security.

159. The system according to claim 158, wherein the processor is configured for executing the logic to calculate respectively the bid persistence indicator and the ask persistence indicator by determining the percentage of the time period for which the market maker has had one or more bids equal to or higher than a level 1 bid for the corresponding security and determining the percentage of the time period for which the market maker has had one or more asks being equal to or lower than a level 1 ask for the corresponding security.

160. The system according to claim 158, wherein the processor is configured for executing the logic to calculate respectively the bid persistence indicator and an ask persistence indicator for each market maker by:

dividing the specified time period into a plurality of segments;

for each segment and for each predetermined security, assigning the market maker a bid value and an ask value of one or zero, a bid value of one being assigned when the market maker has a bid being equal to or higher than a level 1 bid for the security, otherwise a bid value of zero is assigned and an ask value of one being assigned when the market has an ask being equal to or lower than a level 1 ask for the security, otherwise an ask value of zero is assigned; and solving the equation:

$$100\left(\sum VAL_p + \frac{CV - \sum VAL_p}{m}\right)$$

for both bid values and ask values, wherein $\Sigma VAL_P$ is the sum of all values calculated by the equation one segment earlier, m is the number of segments in the time period and CV is the respective current bid value and current ask value assigned to the market maker for the security.

161. The system according to claim 158, further comprising a display device for displaying the bid and ask persistence indicators in a table.

162. The system according to claim 161, wherein the processor is configured for executing the logic to dynamically sort the table based on a parameter selected by the user to reflect current market maker activity.

163. The system according to claim 158, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

164. The system according to claim 163, wherein the filter logic is conducted for a plurality of selected threshold percentages and for each selected threshold a corresponding data set is derived, the bid persistence indicator and the ask persistence indicator being calculated and updated for each predetermined security for each data set.

165. The system according to claim 158, wherein the processor is configured for executing the logic to filter securities from the predetermined securities that have a trade volume below a volume threshold.

166. The system according to claim 158, further comprising a memory device for storing the bid persistence indicator and the ask persistence indicator for each predetermined security, the stored indicators adapted for display as historical market activity.

167. The system according to claim 158, wherein the processor is configured for executing the logic to update each bid persistence indicator and each ask persistence indicator on a periodic basis.

168. The system according to claim 158, wherein the processor is configured for executing the logic to generate an alert if the bid persistence indicator or the ask persistence indicator for one of the predetermined securities crosses a threshold value.

169. The system according to claim 168, wherein the threshold value is globally established for all predetermined securities within the selected set of securities.

170. The system according to claim 168, wherein the threshold value is established for a specific security.

171. A system for tracking activity of a plurality of market makers where the market makers place bids and asks relating to securities traded on at least one common exchange, the system comprising:

an electronic receiver for receiving a dynamically updated data stream of market data containing level 1 data and level 2 data relating to at least a predetermined set of securities traded over the at least one common exchange, wherein the received level 1 data contains a last trade value associated with each of the predetermined securities, and the received level 2 data contains, for market makers associated with each of the predetermined securities, active bids each having a bid price and active asks each having an ask price; and a processor configured for executing logic to, for each of the predetermined securities, dynamically filter the data stream by discarding active bids having a bid price lower than a last trade value minus a selected threshold percentage of the last trade value, and discarding active asks having an ask price higher than the last trade value plus the selected threshold percentage of the last trade value.

172. The system according to claim 171, wherein the processor is configured for executing the logic to discard bids having a price higher than the last trade value plus the selected threshold percentage of the last trade value and to discard asks having a price lower than the last trade value minus the selected threshold percentage of the last trade value.

173. The system according to claim 171, the filter logic is conducted for a plurality of selected threshold percentages and for each selected threshold a corresponding data set is derived.

174. The system according to claim 173, wherein the processor is configured for executing the logic, for each data set for a selected set of securities from the plurality of securities, to derive one or more indicators of a temporary imbalance in market maker activity, the indicator being calculated and updated for each selected security for each data set.

175. The system according to claim 171, wherein the processor is configured for executing the logic, for the filtered data stream for a selected set of securities from the plurality of securities, to derive one or more indicators of a temporary imbalance in market maker activity.

176. The system according to claim 171, wherein the processor is configured for executing the logic to crossed market filter the data stream to exclude bids that are higher than a level 1 bid for an associated security and asks that are lower than a level 1 ask for an associated security.

177. A system for tracking activity of a plurality of market makers where the market makers place bids and asks relating to securities traded on at least one common exchange, the system comprising:
an electronic receiver for receiving a dynamically updated data stream of market data relating to at least a predetermined set of securities traded over the at least one common exchange;
a processor configured for executing logic to:
for each security from the predetermined set of securities, derive a set of indicators from the market data indicative of a temporary imbalance in market maker activity for the security; and
update the set of indicators to be current relative to the dynamically updated data stream; and
a display for displaying the set of indicators;
wherein the processor further executes logic to dynamically sort the displayed set of indicators so that the set of indicators are displayed in a relative order based on a parameter selected by a user as the set of indicators are dynamically updated to be current with market maker activity.

178. The system according to claim 177, wherein the logic to carry out the dynamic sorting can be turned off so that a relative display order stays constant but the indicator for each predetermined security is updated.

179. The system according to claim 177, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

180. The system according to claim 179, wherein the filter logic is conducted for a plurality of selected threshold percentages and for each selected threshold a corresponding data set is derived, the indicators being calculated and updated for each predetermined security for each data set.

181. The system according to claim 177, wherein the processor is configured for executing the logic to update the indicators on a periodic basis.

182. The system according to claim 181, wherein the indicators are displayed on the display device on a periodic basis.

183. A system for tracking activity of a plurality of market makers where the market makers place bids and asks relating to securities traded on at least one common exchange, the system comprising:
an electron receiver for receiving a dynamically updated data stream of market data containing level 2 data relating to at least a predetermined set of securities traded over the at least one common exchange;
a processor configured for executing logic to:
for each security from the predetermined set of securities, derive a set of indicators from the level 2 data indicative of a temporary imbalance in market maker activity for the security; and
update the set of indicators to be current relative to the dynamically updated data stream; and
a display device for displaying a chart of one or more of the indicators from the set of indicators over a period of time for one of the predetermined securities.

184. A system for tracking activity of a plurality of market makers where the market makers place bids and asks relating to securities traded on at least one common exchange, the system comprising:
an electronic receiver for receiving a dynamically updated data stream of market data containing level 2 data relating to at least a predetermined set of securities traded over the at least one common exchange, the received level 2 data containing, for market makers associated with each of the predetermined securities, active bids each having a bid volume and bid price, and active asks each having an ask volume and ask price; and
a processor configured for executing logic to:
group the active bids by price to generate a series of bid price groups, each bid price group but one containing bids of the same price for the bid price group, the remaining bid price group containing all bids having a price more than a specified number of price changes away from an inside bid price;
sum the volume of market maker bids in each bid price group and sum the number of market makers having active bids in each bid price group;
display the total volume for each bid price group and the total number of bids in each bid price group on a display;
group the active asks by price to generate a series of ask price groups, each ask price group but one containing asks of the same price for the ask price group, the remaining ask price groups containing all asks having a price more than a specified number of price changes away from an inside ask price;
sum the volume of market maker asks in each ask price group and sum the number of market makers having active asks in each ask price group;
display the total volume for each ask price group and the total number of asks in each ask price group on the display; and
update the bid price groups and ask price groups to be current with the dynamically updated data stream;
wherein the total volume for each bid price group and the total number of bids in each bid price group as compared to the total volume for each ask price group and the total number of asks in each ask price group are indicative of a temporary imbalance in market maker activity for the security.

185. The system according to claim 184, wherein the processor is configured for executing the logic to filter the data stream and, for each predetermined security, the logic discards bids having a price lower than the last trade value minus a selected threshold percentage of the last trade value and discards asks having a price higher than the last trade value plus a selected threshold percentage of the last trade value.

186. The system according to claim 185, wherein the filter logic is conducted for a plurality of selected threshold percentages and for each selected threshold a corresponding data set is derived, the total volume for each bid price group and the total volume for each ask price group being calculated and updated for each selected predetermined for each data set.

187. A method of tracking activity of a plurality of market makers relating to securities traded on at least one common exchange where the market makers place bids and asks, the method comprising:
receiving with an electronic receiver a dynamically updated data stream containing the bids and asks for the securities traded over the at least one exchange; and
analyzing each data item within the data stream and transforming the market data to derive with an automated processor configured for executing logic an indicator from the bids and asks for each of a plurality of the securities as a function of coactive behavior of a plurality market makers across the plurality of securities, wherein the indicator is indicative of a temporary imbalance in market maker activity for the corresponding security.

188. The method according to claim 187, wherein deriving the indicator with the configured processor includes summing the volume of each active bid associated with each security and summing the volume of each active ask associated with each security.

189. The method according to claim 187, wherein deriving the indicator with the configured processor includes summing the total number of market makers having an active bid associated with each security and summing the total number of market makers having an active ask associated with each security.

190. The method according to claim 187, wherein deriving the indicator with the configured processor includes determining whether a bid placed by any of the market makers has a value higher than, the same as or lower than the previous bid placed by the same market maker and determining whether an ask placed by any of the market makers has a value higher than, the same as or lower than the previous ask placed by the same market maker.

191. The method according to claim 190, further including, for each security, deriving buy pressure with the configured processor by counting active bids that have increased in price and reducing the number of bids that have increased in price by a number of active bids that have decreased in price and deriving sell pressure with the configured processor by counting active asks that have increased in price and reducing the number of asks that have increased in price by a number of active asks that have decreased in price.

192. The method according to claim 191, further including, for each security, converting buy pressure to relative buy pressure with the configured processor by dividing the buy pressure by a number of market makers having active bids for the security and converting sell pressure to relative sell pressure with the configured processor by dividing the sell pressure by a number of market makers having active asks for the security.

193. The method according to claim 191, further including, for each security, deriving pressurized bid volume with the configured processor by summing the bid volume for each active bid that has increased in price and subtracting the bid volume for each active bid that has decreased in price, and deriving pressurized ask volume with the configured processor by summing the ask volume for each active ask that has increased in price and subtracting the ask volume for each active ask that has decreased in price.

194. The method according to claim 187, further comprising selecting a market maker and wherein deriving the indicator with the configured processor includes identifying each security for which the selected market maker has at least one of an active bid or an active ask, and for the selected market maker generating a list of the identified securities along with an indication of the market maker's bid volume and ask volume for the identified securities.

195. The method according to claim 187, wherein deriving the indicator with the configured processor includes determining the combined bid volume and combined ask volume for each market maker for each security.

196. The method according to claim 187, wherein deriving the indicator with the configured processor includes summing the bid volume of each active bid of each market maker for each security and summing the ask volume of each active ask of each market maker for each security.

197. The method according to claim 187, wherein deriving the indicator with the configured processor includes, for each security and over a specified time period, determining a bid persistence indicator and an ask persistence indicator for each market maker, the bid persistence indicator determined by calculating the approximate portion of the specified time period that the market maker has had one or more bids being equal to or higher than a level 1 bid for the security, and the ask persistence indicator determined by calculating the approximate portion of the specified time period that the market maker has had one or more asks being equal to or lower than a level 1 ask for the security.

198. The method according to claim 187, further comprising, on a security by security basis:
grouping the bids by price with the configured processor to generate a series of bid groups, each bid price group but one containing bids of the same price for the bid price group, the remaining bid price group containing all bids having a price more than a specified number of price changes away from an inside bid price;
summing the volume of bids with the configured processor in each bid price group and summing the number of bids with the configured processor in each bid price group;
displaying on a display device the total volume for each bid price group and the number of bids in each bid price group;
grouping the asks by price with the configured processor to generate a series of ask price groups, each ask price group but one containing asks of the same price for the ask price group, the remaining ask price group containing all asks having a price more than a specified number of price changes away from an inside ask price;
summing the volume of asks with the configured processor in each ask price group and summing the number of asks with the configured processor in each ask price group; and
displaying on the display device the total volume for each price group and the number of asks in each ask price group.

199. The method according to claim 187, further comprising displaying on a display device the indicators in at least one of a table or a chart.

200. The method according to claim 199, further comprising dynamically sorting the at least one of the table or the chart with the configured processor to reflect current market maker activity.

201. The method according to claim 187, wherein before the deriving step, the method further comprises the step of filtering the data stream with the configured processor, the step of filtering including for each security, discarding bids having a price lower than the last trade value minus a selected threshold percentage of the last trade value and discarding asks having a price higher than the last trade value plus a selected threshold percentage of the last trade value.

202. The method according to claim 201, wherein the step of filtering with the configured processor is conducted for a plurality of selected threshold percentages and for each selected threshold percentage a corresponding data set is derived, the indicators being calculated and updated for each security for each data set.

203. The method according to claim 187, further comprising storing the indicators in a memory device, the stored indicators adapted for display as historical market maker activity.

204. The method according to claim 187, wherein the indicators are updated with the configured processor on a periodic basis.

205. The method according to claim 187, further comprising generating an alert with the configured processor if at least one of the indicators crosses a threshold value.

206. A computer readable medium device storing a program to track activity of a plurality of market makers relating to securities traded on at least one common exchange where the market makers place bids and asks, comprising:

code that receives a dynamically updated data stream containing the bids and asks for the securities traded over the at least one exchange; and code that derives an indicator from the bids and asks for each of a plurality of the securities as a function of inter-related collective and coactive behavior of a plurality of market makers across the securities, wherein the indicator is indicative of a temporary imbalance in market maker activity for the corresponding security.

207. A system for tracking activity of a plurality of market makers relating to securities traded on at least one common exchange where the market makers place bids and asks, the system comprising:

an electronic receiver for receiving a dynamically updated data stream containing the bids and asks for the securities traded over the at least one exchange; and a processor configured for executing logic to derive an indicator from the bids and asks for each of a plurality of the securities as a function of the inter-related collective and coactive behavior of a plurality of market makers across the securities, wherein the indicator is indicative of a temporary imbalance in market maker activity for the corresponding security.

* * * * *

UNITED STATES PATENT AND TRADEMARK OFFICE
CERTIFICATE OF CORRECTION

PATENT NO. : 7,664,695 B2
APPLICATION NO. : 09/911772
DATED : February 16, 2010
INVENTOR(S) : Stephen Cutler It is certified that error appears in the above-identified patent and that said Letters Patent is hereby corrected as shown below:

Column 1, line 47, "(i.e., last trade)" should read -- (i.e., last trade value) --

Column 3, line 36, "According to another aspect of the invention" should read -- According to yet another aspect of the invention --

Column 3, lines 53-61,
"for each selected security and over a specified time period, determining a bid persistence statistic and an ask persistence statistic for market maker, the bid persistence statistic determined by calculating the approximate portion of the specified time period that the market maker has had one or more bids being equal to or higher than a level 1 bid for security, and ask persistence that the market maker has had one or more asks being equal to or lower than a level 1 ask for the security"

should read

-- determining the combined bid volume and ask volume for each market maker for each selected security from the selected set of securities.
According to still another aspect of the invention, the invention is a method of tracking activity of a plurality of market makers relating to securities traded on at least one common exchange where the market makers place bids and asks. The method including the steps of receiving a dynamically updated data stream containing level 1 and level 2 data relating to a plurality of securities traded over the at least one exchange, the level 1 data including at least the last trade price of each security and the level 2 data containing a bid price, a bid time, a bid volume, a security identifier, and a market maker identifier for each bid, and an ask price, an ask time, an ask volume, a security identifier and a market maker identifier for each ask; and analyzing the data stream to derive a statistic indicative of temporary upward or downward price pressure, the statistic derived for each market maker and updated based on the updated data stream, wherein deriving the statistic includes for each market maker, summing the bid volume of each active bid of each market maker for a selected set of securities and summing the ask volume of each active ask of each market maker for a selected set of securities. --

Column 32, line 48, "The method according to claim 26" should read -- The method according to claim 36 --

Column 50, line 10, "an electron receiver" should read -- an electronic receiver --

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,664,695 B2 | Page 1 of 1 |
| APPLICATION NO. | : 09/911772 | |
| DATED | : February 16, 2010 | |
| INVENTOR(S) | : Stephen Cutler | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2165 days.

Signed and Sealed this

Thirtieth Day of November, 2010

David J. Kappos
*Director of the United States Patent and Trademark Office*